(12) United States Patent
Atkinson et al.

(10) Patent No.: US 10,382,617 B2
(45) Date of Patent: Aug. 13, 2019

(54) MANAGING FEATURES ASSOCIATED WITH A USER EQUIPMENT BASED ON A LOCATION OF THE USER EQUIPMENT WITHIN A VEHICLE

(71) Applicant: QUALCOMM Incorporated, San Diego, CA (US)

(72) Inventors: William Lloyd Atkinson, Toronto (CA); Tung Chuen Kwong, Markham (CA); Benjamin Koon Pan Chan, Markham (CA); Henry Hing Law, Scarborough (CA); Wilson Hung Yu, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/360,142

(22) Filed: Nov. 23, 2016

(65) Prior Publication Data

US 2017/0078475 A1 Mar. 16, 2017

Related U.S. Application Data

(62) Division of application No. 14/196,935, filed on Mar. 4, 2014, now Pat. No. 9,537,989.

(51) Int. Cl.
*H04N 1/60* (2006.01)
*H04W 4/80* (2018.01)
(Continued)

(52) U.S. Cl.
CPC ...... *H04M 1/72577* (2013.01); *H04B 17/318* (2015.01); *H04L 67/12* (2013.01);
(Continued)

(58) Field of Classification Search
CPC ........... H04M 1/72577; H04M 1/6083; H04M 11/007; H04M 19/04; H04W 4/02
See application file for complete search history.

(56) References Cited

U.S. PATENT DOCUMENTS

| 8,290,480 B2 | 10/2012 | Abramson et al. |
| 8,336,664 B2 | 12/2012 | Wallace et al. |
| (Continued) | | |

FOREIGN PATENT DOCUMENTS

| CN | 101399889 A | 4/2009 |
| CN | 103339010 A | 10/2013 |
| (Continued) | | |

OTHER PUBLICATIONS

Bluetooth, "Specification of the Bluetooth System", Bluetooth Specification Version 4.0, Jun. 30, 2010, 2302 Pages.
(Continued)

*Primary Examiner* — Dung Hong
(74) *Attorney, Agent, or Firm* — MG-IP Law, P.C.

(57) ABSTRACT

In an aspect, a user equipment (UE) is positioned within a driver operation zone of a vehicle, one or more UE-based user interfaces (UIs) are restricted and forwarded to a vehicle-based UI controller to permit access to the one or more UE-based features via a vehicle-based UI. In another aspect, the UE in the driver operation zone is engaged in hands-free speakerphone mode via a vehicle audio system of the vehicle, and an attempt to transition the UE to handset-based audio mode is blocked. In another aspect, when a handset-based audio capture and/or playback attempt of the UE is detected, the UE interacts with a vehicle audio system to temporarily reduce volume being output by one or more proximal speakers. In another aspect, the UE streams media to a media presentation device in its own zone or another zone of the vehicle for presentation thereon.

20 Claims, 19 Drawing Sheets

(51) Int. Cl.
  *H04L 29/08* (2006.01)
  *H04M 1/725* (2006.01)
  *H04W 4/021* (2018.01)
  *H04B 17/318* (2015.01)
  *H04M 1/60* (2006.01)
  *H04W 4/04* (2009.01)

(52) U.S. Cl.
  CPC ......... *H04M 1/6075* (2013.01); *H04W 4/021* (2013.01); *H04W 4/046* (2013.01); *H04W 4/80* (2018.02); *H04M 1/6091* (2013.01)

(56) References Cited

U.S. PATENT DOCUMENTS

| | | | |
|---|---|---|---|
| 2005/0221877 A1 | 10/2005 | Davis et al. | |
| 2007/0143798 A1 | 6/2007 | Jira et al. | |
| 2008/0085689 A1* | 4/2008 | Zellner | H04M 1/6075 455/187.1 |
| 2009/0104929 A1 | 4/2009 | Li et al. | |
| 2009/0326928 A1* | 12/2009 | Omiya | G06F 3/165 704/200.1 |
| 2010/0216401 A1* | 8/2010 | Kitahara | H04M 1/6091 455/41.2 |
| 2010/0329488 A1* | 12/2010 | Holub | H04R 27/00 381/301 |
| 2011/0021234 A1* | 1/2011 | Tibbitts | H04W 48/04 455/517 |
| 2011/0039581 A1* | 2/2011 | Cai | G01S 19/14 455/456.4 |
| 2011/0105097 A1* | 5/2011 | Tadayon | H04W 4/50 455/418 |
| 2011/0195699 A1* | 8/2011 | Tadayon | H04B 5/0062 455/418 |
| 2012/0006610 A1 | 1/2012 | Wallace et al. | |
| 2012/0006611 A1* | 1/2012 | Wallace | H04M 1/67 180/272 |
| 2012/0202479 A1* | 8/2012 | Sugitani | G08C 17/02 455/420 |
| 2012/0225634 A1 | 9/2012 | Gee et al. | |
| 2013/0274997 A1* | 10/2013 | Chien | G06F 17/00 701/36 |
| 2013/0336094 A1 | 12/2013 | Gruteser et al. | |
| 2015/0126171 A1* | 5/2015 | Miller | H04L 67/125 455/418 |
| 2015/0237662 A1* | 8/2015 | Fischer | H04W 76/14 455/41.3 |
| 2015/0256668 A1 | 9/2015 | Atkinson et al. | |
| 2015/0341742 A1* | 11/2015 | Chen | H04W 4/38 370/329 |

FOREIGN PATENT DOCUMENTS

| | | |
|---|---|---|
| CN | 103373298 A | 10/2013 |
| CN | 103392351 A | 11/2013 |
| EP | 1800459 B1 | 10/2008 |
| EP | 2387202 A1 | 11/2011 |
| EP | 2654276 A1 | 10/2013 |
| GB | 2453239 A | 4/2009 |
| JP | H0673915 U | 10/1994 |
| JP | 2005328116 A | 11/2005 |
| JP | 2009177588 A | 8/2009 |
| JP | 2011151445 A | 8/2011 |
| WO | 2013165989 A2 | 11/2013 |
| WO | 2013181310 A2 | 12/2013 |

OTHER PUBLICATIONS

Dimitrova D.C., et al., "Inquiry-based Bluetooth Parameters for Indoor Localisation—an experimental study," 2011, pp. 1-9.

Franssens A., "Impact of Multiple Inquirers on the Bluetooth Discovery Process—and its Application to Localization", University of Twente, Jul. 2010, pp. 1-83.

International Search Report and Written Opinion—PCT/US2015/018444—ISA/EPO—dated Oct. 20, 2015.

Liu J., et al., "Energy Analysis of Device Discovery for Bluetooth Low Energy", 2013 IEEE 78th Vehicular Technology Conference (VTC Fall), IEEE, Sep. 2, 2013 (Sep. 2, 2013), pp. 1-5, XP032548414, ISSN: 1090-3038, DOI: 10.1109/VTCFALL.2013.6692181 [retrieved on Dec. 22, 2013].

Yedavalli K., et al., "Sequence-Based Localization in Wireless Sensor Networks," IEEE Transactions on Mobile Computing, Jan. 2008, vol. 7, No. 1, pp. 1-14.

European Search Report—EP17175092—Search Authority—The Hague—dated Jun. 30, 2017.

\* cited by examiner

MANAGING FEATURES ASSOCIATED WITH A USER EQUIPMENT BASED ON A LOCATION OF THE USER EQUIPMENT WITHIN A VEHICLE

CROSS-REFERENCE TO RELATED APPLICATIONS

The present application for patent is a Divisional of U.S. Non-Provisional application Ser. No. 14/196,935, entitled "MANAGING FEATURES ASSOCIATED WITH A USER EQUIPMENT BASED ON A LOCATION OF THE USER EQUIPMENT WITHIN A VEHICLE", filed on Mar. 4, 2014, which is assigned to the assignee hereof and hereby expressly incorporated by reference herein in its entirety.

INTRODUCTION

Aspects of this disclosure relate generally to managing features associated with a user equipment (UE) based on a location of the UE within a vehicle.

Distracted driving is a major problem today, and UEs such as smartphones are a leading cause of distractions. Current approaches to limit this type of distraction usually require user intervention. For example, while some UEs support "driver" modes that allow drivers to opt-into a safer experience, the user still needs to manually enable the driver mode. One barrier to automatically setting the smartphone's mode is being able to automatically detect whether a phone (or other client device) is actually being operated by the driver. For example, a UE can be registered to a driver, but despite this registration, the UE could be operated by a passenger instead of the driver.

Further, even if a particular UE can be identified as driver-operated, simply blocking all features of a driver-operated UE may be a draconian safety solution. For example, an in-vehicle user interface (UI) can provide a safe mechanism through which the driver can access various features, but it is generally difficult for UEs to extend and/or handoff their particular UIs onto in-vehicle UIs.

SUMMARY

In an aspect, a user equipment (UE) is positioned within a driver operation zone of a vehicle, one or more UE-based user interfaces (UIs) are restricted and forwarded to a vehicle-based UI controller to permit access to the one or more UE-based features via a vehicle-based UI. In another aspect, the UE in the driver operation zone is engaged in hands-free speakerphone mode via a vehicle audio system of the vehicle, and an attempt to transition the UE to handset-based audio mode is blocked. In another aspect, when a handset-based audio capture and/or playback attempt of the UE is detected, the UE interacts with a vehicle audio system to temporarily reduce volume being output by one or more proximal speakers. In another aspect, the UE streams media to a media presentation device in its own zone or another zone of the vehicle for presentation thereon.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
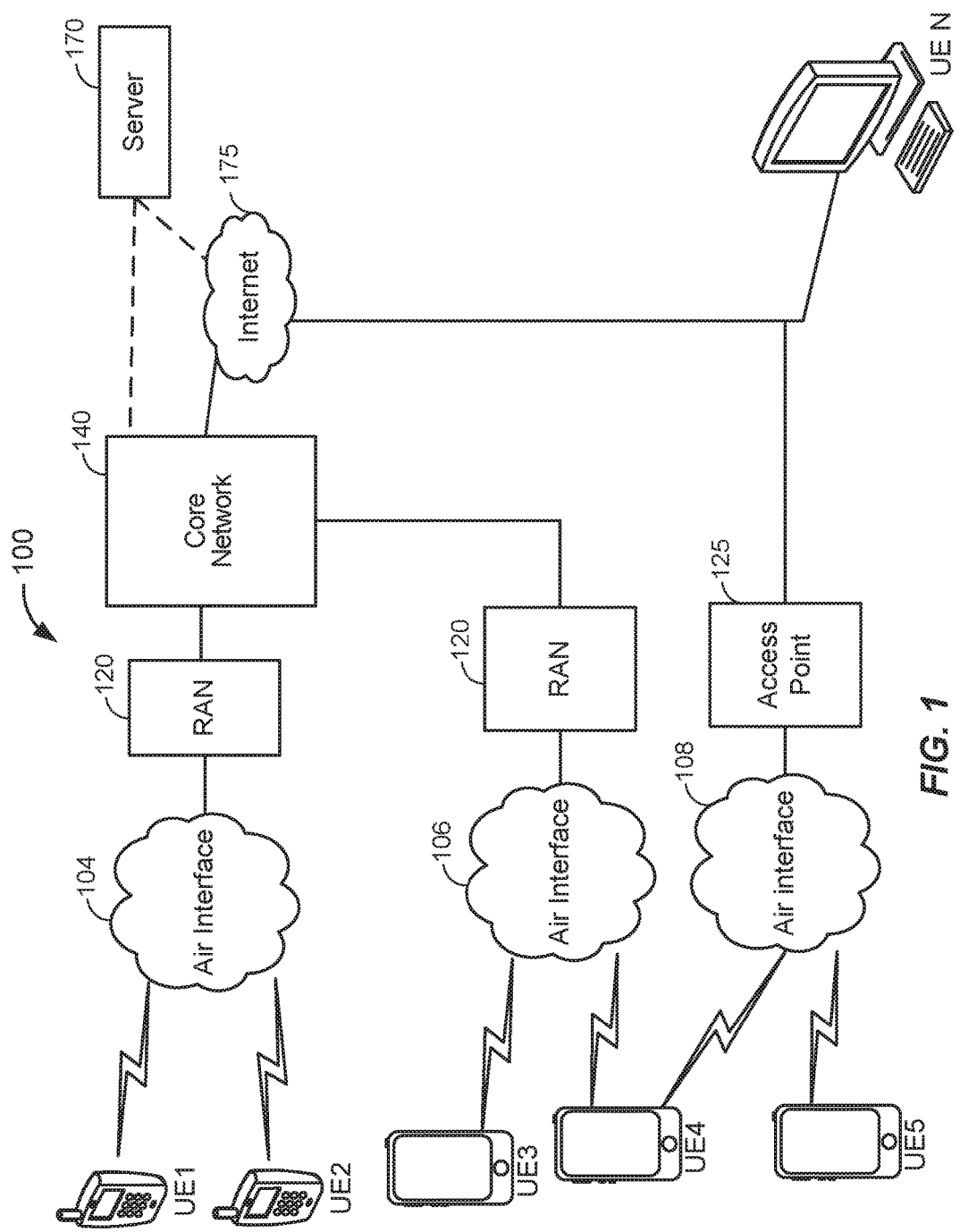
FIG. 1 illustrates a high-level system architecture of a wireless communications system in accordance with an aspect of the disclosure.

The disclosure relates in some aspects to managing features of a client device or user equipment (UE) based on a location of the UE within a vehicle. For example, one aspect of the disclosure relates to determining that the UE is positioned in a driver zone of the vehicle, and then forwarding a user interface (UI) of the UE to a vehicle UI controller for presentation via a vehicle UI instead of the UI of the UE (e.g., see FIGS. 5-8). Another aspect of the disclosure relates to determining that the UE, while engaged in hands-free speakerphone mode, is positioned in a driver zone of the vehicle, and then blocking a transition of the UE from the hands-free speakerphone mode to handset-based audio mode when an attempt to transition the UE into handset-based audio mode is detected (e.g., such as when the UE is moved in proximity to an ear of an operator of the UE, see FIG. 9). Another aspect of the disclosure relates to determining a current zone of the vehicle in which the UE is located, detecting an incoming call directed to the UE and then temporarily reducing volume of one or more proximal speakers based on the zone determination (e.g., see FIGS. 10-11). Another aspect of the disclosure relates to determining a current zone of the vehicle in which the UE is located, classifying the determined zone as an administrator zone or a guest zone, and then permitting a level of access to data and/or services via the UE that is based on the zone determination (e.g., see FIG. 12). Another aspect of the disclosure relates to determining a current zone of the vehicle in which the UE is located, associating the UE with a set of media presentation devices based on the zone determination and then streaming media from the UE to the associated set of media presentation devices for presentation thereon (e.g., see FIGS. 13-14). Another aspect of the disclosure relates to determining a current zone of the vehicle in which the UE is located, receiving a request to stream media to a different zone than the current zone, associating the UE with a set of media presentation devices of the different zone and then streaming media from the UE to the associated set of media presentation devices for presentation thereon (e.g., see FIGS. 14-15).

Aspects of the disclosure are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an aspect of the disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. As will be described below in more detail, the server 170 is configured to support one or more communication services (e.g., Voice-over-Internet Protocol (VoIP) sessions, Push-to-Talk (PTT) sessions, group communication sessions, social networking services, etc.) for UEs that can connect to the server 170 via the core network 140 and/or the Internet 175, and/or to provide content (e.g., web page downloads) to the UEs.

Figure 2:
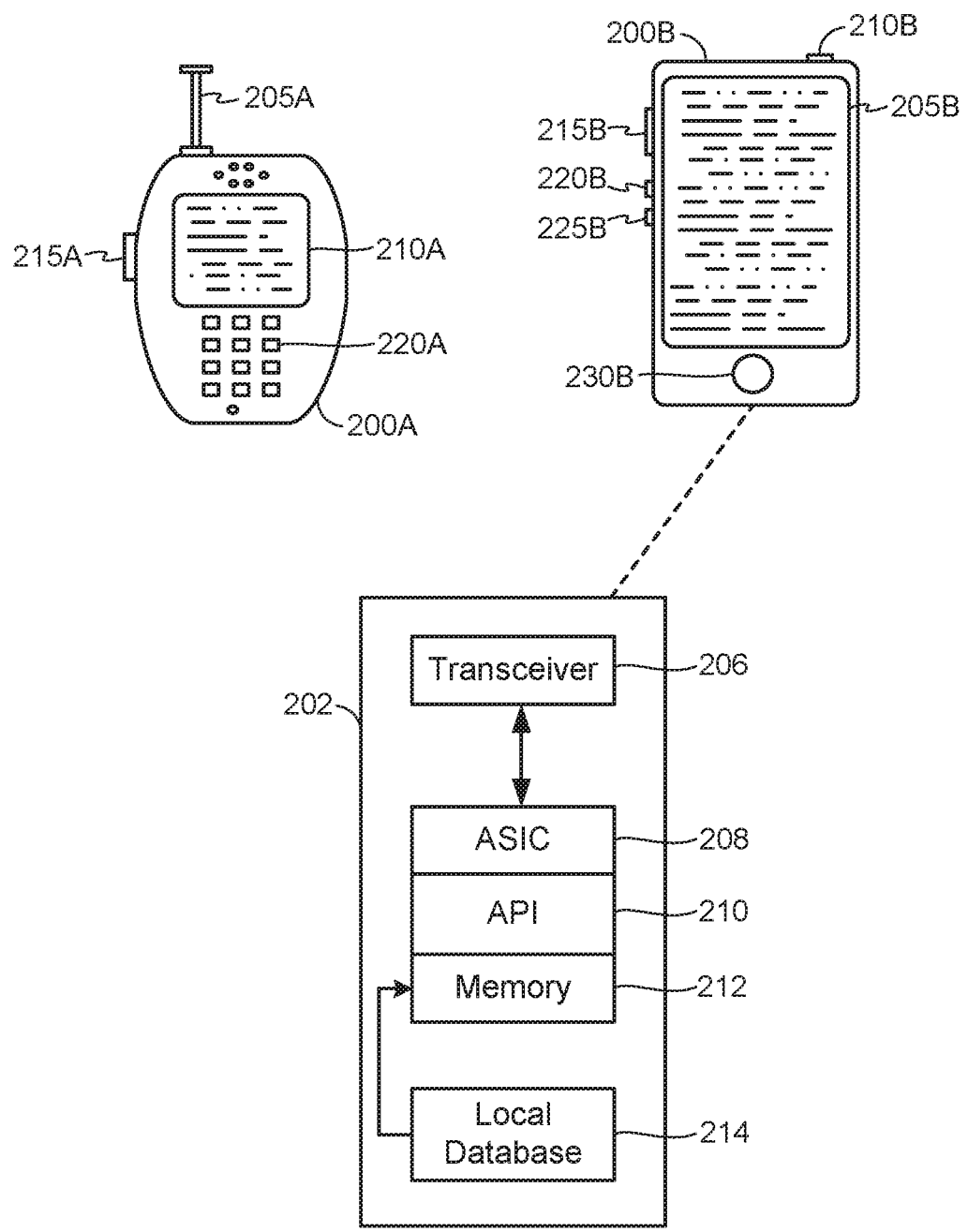
FIG. 2 illustrates examples of user equipments (UEs) in accordance with aspects of the disclosure.

FIG. 2 illustrates examples of UEs (i.e., client devices) in accordance with aspects of the disclosure. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), at least one front-panel button 230B (e.g., a Home button, etc.), among other components, as is known in the art. While not shown explicitly as part of UE 200B, the UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like.

Accordingly, an aspect of the disclosure can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the disclosure is not limited to the illustrated features or arrangement.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the aspects of the disclosure and are merely to aid in the description of aspects of aspects of the disclosure.

Figure 3:
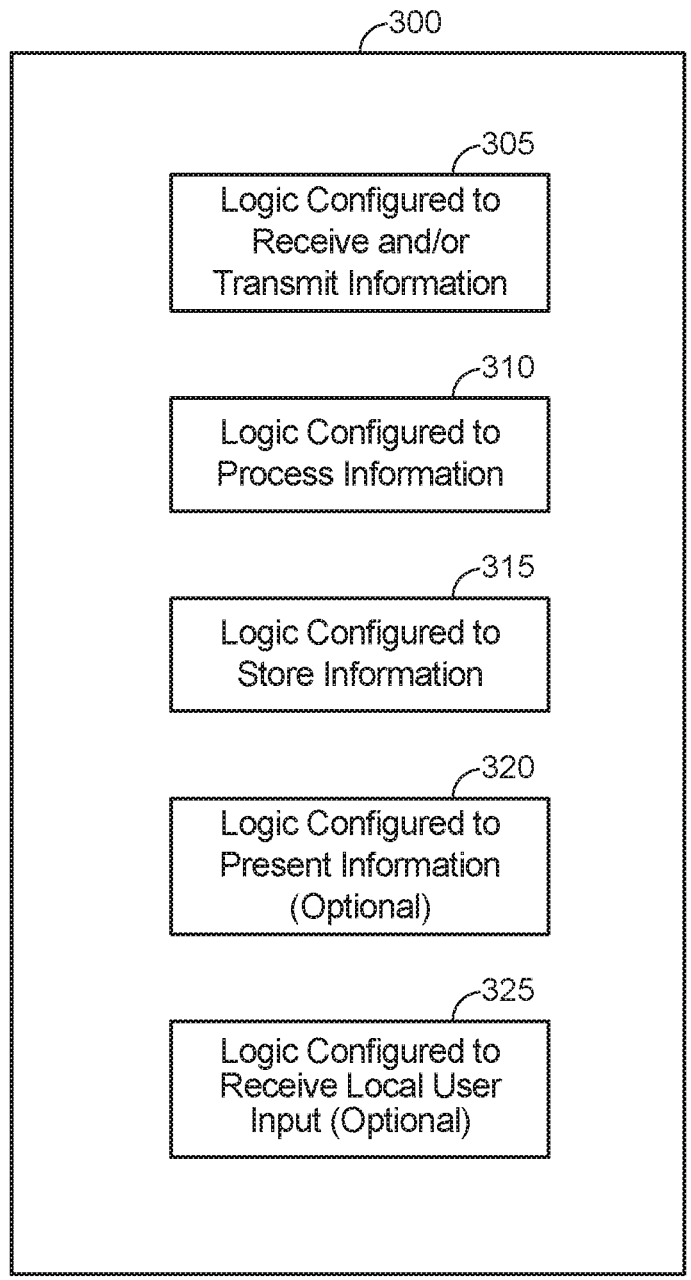
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to UEs 200A or 200B, any component of the RAN 120, any component of the core network 140, any components coupled with the core network 140 and/or the Internet 175 (e.g., the server 170), and so on. Thus, communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., UE 200A or 200B, access point 125, a BS, Node B or eNodeB in the RAN 120, etc.), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., server 170, etc.), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM memory, flash memory, ROM memory, EPROM memory, EEPROM memory, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200A or UE 200B as shown in FIG. 2, the logic configured to present information 320 can include the display 210A of UE 200A or the touchscreen display 205B of UE 200B. In a further example, the logic configured to present information 320 can be omitted for certain communication devices, such as network communication devices that do not have a local user (e.g., network switches or routers, remote servers such as the server 170, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200A or UE 200B as shown in FIG. 2, the logic configured to receive local user input 325 can include the keypad 220A, any of the buttons 215A or 210B through 225B, the touchscreen display 205B, etc. In a further example, the logic configured to receive local user input 325 can be omitted for certain communication devices, such as network communication devices that do not have a local user (e.g., network switches or routers, remote servers such as the server 170, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
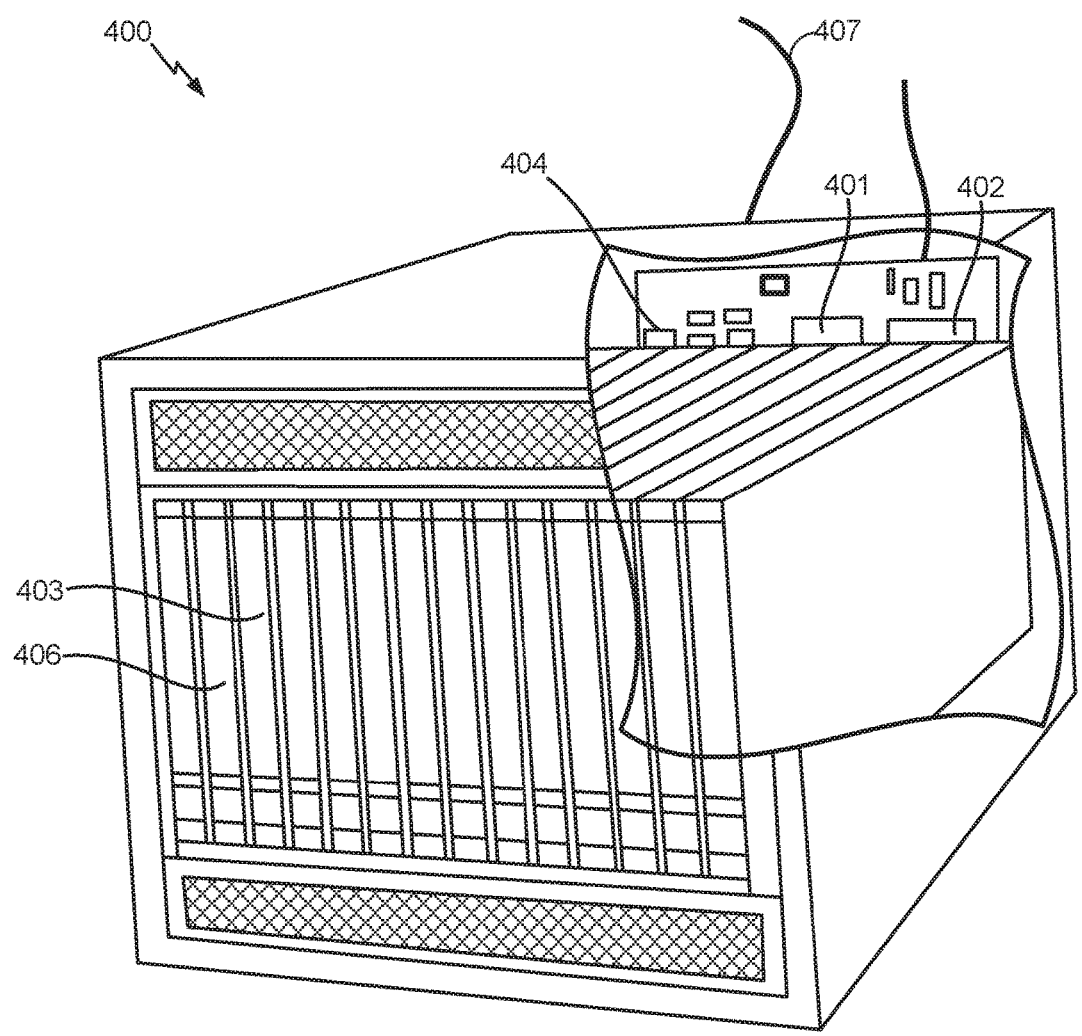
FIG. 4 illustrates a server in accordance with an aspect of the disclosure.

The various aspects may be implemented on any of a variety of commercially available server devices, such as server 400 illustrated in FIG. 4. In an example, the server 400 may correspond to one example configuration of the server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access ports 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to a UE implementation as in 205A or 205B as in FIG. 2.

Figure 5:
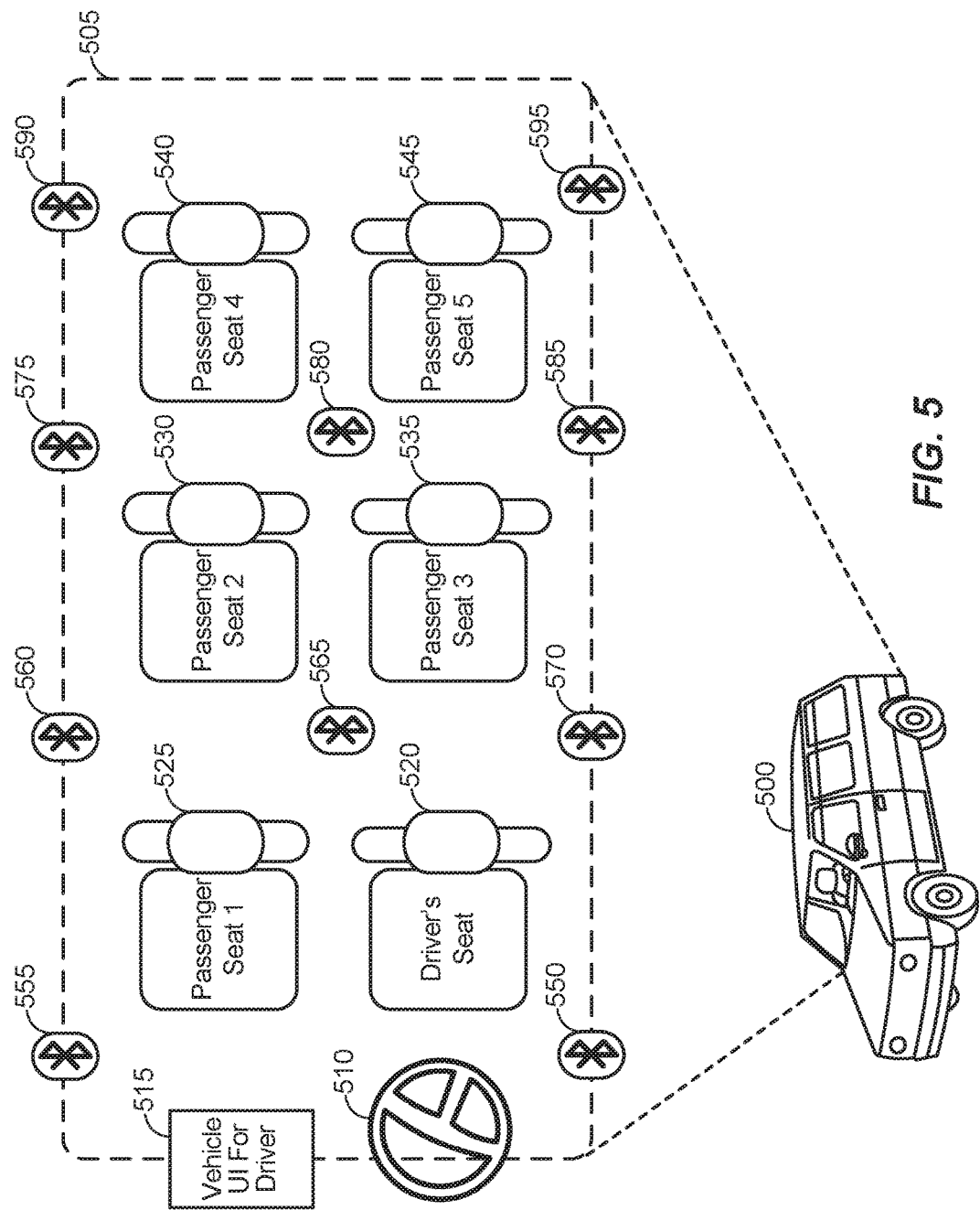
FIG. 5 illustrates a vehicle with an in-vehicle configuration in accordance with an aspect of the disclosure.

FIG. 5 illustrates a vehicle 500 with an in-vehicle configuration 505 in accordance with an aspect of the disclosure. In particular, the in-vehicle configuration 505 includes a steering wheel 510, a vehicle UI 515 that is accessible to a driver of the vehicle 500), a driver seat 520 and a plurality of passenger seats 525 through 545, and a plurality of Bluetooth transceivers 550 through 595 that are deployed throughout the vehicle 500. The Bluetooth transceivers 550 through 595 collectively correspond to one example of an "in-vehicle location detection system" that is configured to detect (or to help a UE detect) an in-vehicle location of the UE. For example, as is known in the art, a Bluetooth transceiver deployed on the UE (not shown explicitly in FIG. 5) can exchange signals with the Bluetooth transceivers 550 through 595 that are positioned in an indoor environment along with the UE in order to measure Bluetooth Low Energy (BTLE) Received Signal Strength Indicator (RSSI). For a given transmit power, BTLE RSSI correlates inversely with distance, so BTLE RSSI from one or more of the Bluetooth transceivers 550 through 595 can be used to approximate the location of the UE within the indoor environment, in this case, the vehicle 500. Of course, aspects of the disclosure are not limited to Bluetooth-based in-vehicle location detection systems, and other aspects of the disclosure could extend to in-vehicle location detection systems based on other technologies.

Figure 6:
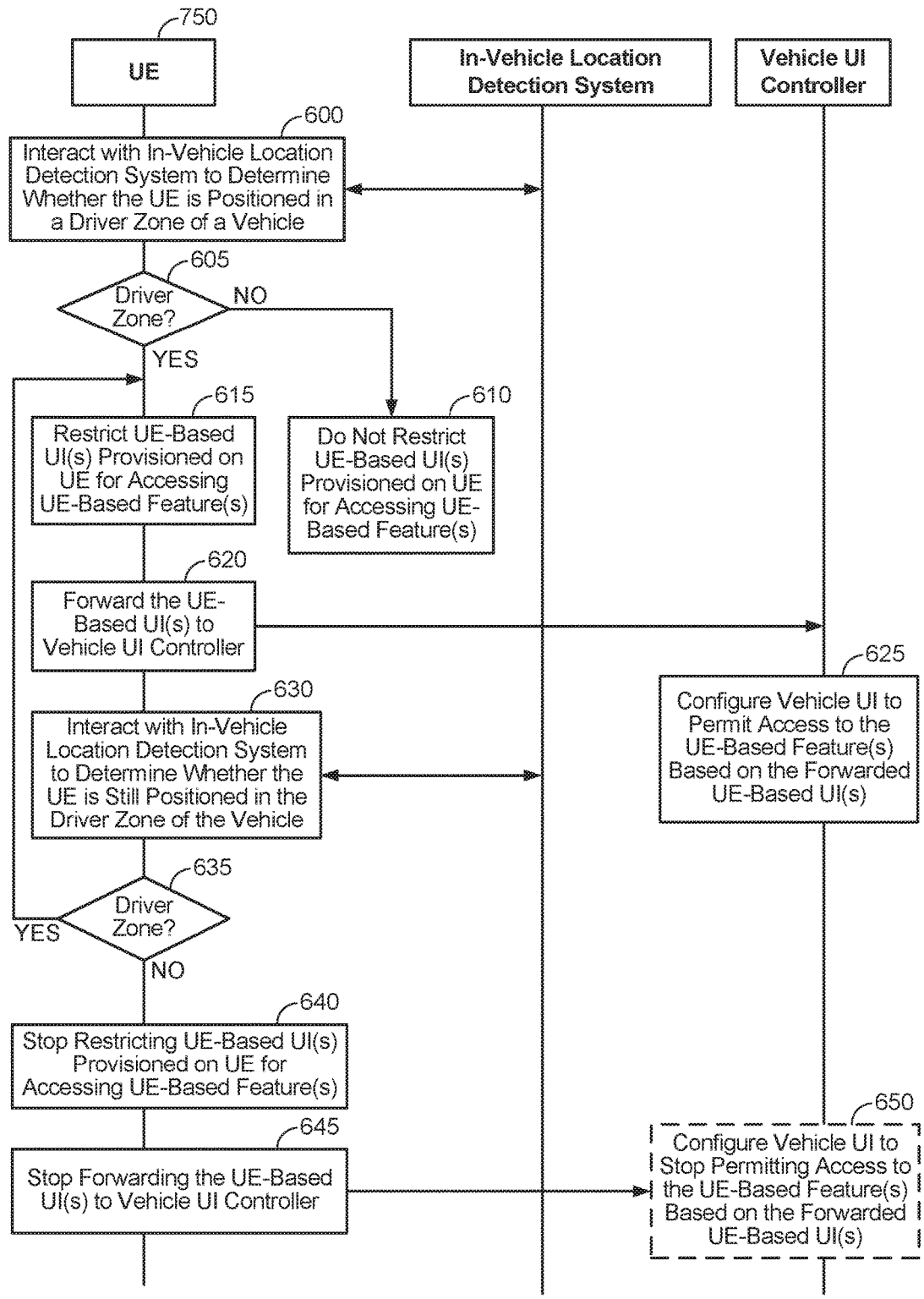
FIG. 6 illustrates a process of restricting access to a UE-based user interface (UI) and forwarding the UE-based UI to a vehicle UI controller for presentation on a vehicle UI in accordance with an aspect of the disclosure.
Figure 7:
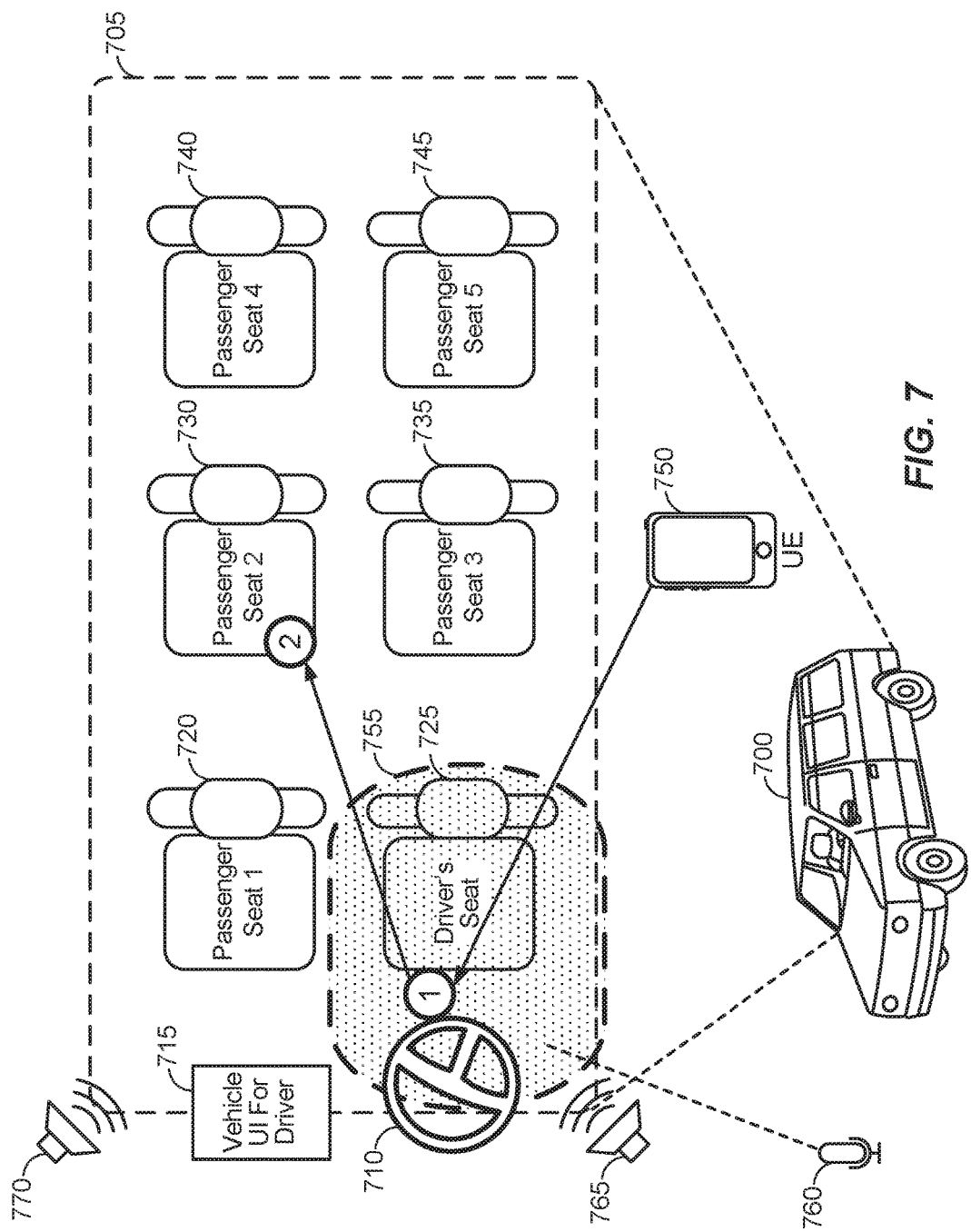
FIG. 7 illustrates a vehicle with another in-vehicle configuration in accordance with an aspect of the disclosure.

FIG. 6 illustrates a process of restricting access to a UE-based UI and forwarding the UE-based UI to a vehicle UI controller for presentation on a vehicle UI in accordance with an aspect of the disclosure. Below, FIG. 6 is described with reference to FIG. 7. FIG. 7 illustrates a vehicle 700 that is configured similarly to the vehicle 500 of FIG. 5, whereby 700 through 745 of FIG. 7 generally correspond to 500 through 545 of FIG. 5, respectively. However, in FIG. 7, the Bluetooth transceivers 550 through 595 are not explicitly illustrated (although these transceivers and/or components of another in-vehicle location detection system are presumed to be present in at least one aspect). Also, FIG. 7 further illustrates a UE 750 that moves inside of a defined driver zone 755 (e.g., defined by the UE 750 itself by partitioning an interior space of the vehicle 700 into the driver zone 755 and one or more non-driver zones, by an associated in-vehicle detection system of the vehicle 700, etc.), to outside of the driver zone 755, as will be described in more detail below with respect to FIG. 6. In an example, the driver zone 755 can be configured differently based on where a driver is expected to be located (e.g., in the front-left seat in the United States, in the front-right seat in other countries such as Ireland, etc.). Also shown in FIG. 7 is a microphone 760 and speakers 765 and 770 that collectively comprise part of an in-vehicle audio system.

With reference to FIG. 6, UE 750 interacts with an in-vehicle location detection system (e.g., such as the Bluetooth in-vehicle location detection system described above with respect to FIG. 5) to determine whether UE 750 is positioned in the driver zone 755 of the vehicle 700, 600. For example, similar to the discussion above with respect to FIG. 5, in 600, Bluetooth signals can be exchanged between a Bluetooth transceiver on UE 750 and the Bluetooth transceivers 550 through 595 in order to calculate the relative in-vehicle position of UE 750 within the vehicle 700. The relative in-vehicle location can then be compared with the driver zone 755 to determine whether the relative in-vehicle location falls within the defined driver zone 755 illustrated in FIG. 7.

At 605, if UE 750 is determined not to be positioned in the driver zone 755, then UE 750 does not restrict one or more UE-based UIs provisioned on UE 750 for accessing one or more UE-based features, 610. For example, the one or more UE-based UIs can include a texting UI, and the one or more UE-based features can include access to a corresponding texting application, such that 610 functions to permit texting by an operator of UE 750. In another example, the one or more UE-based UIs can include a web-browsing UI, and the one or more UE-based features can include access to a corresponding web-browsing application, such that 610 functions to permit web-browsing by an operator of UE 750.

Figure 8:
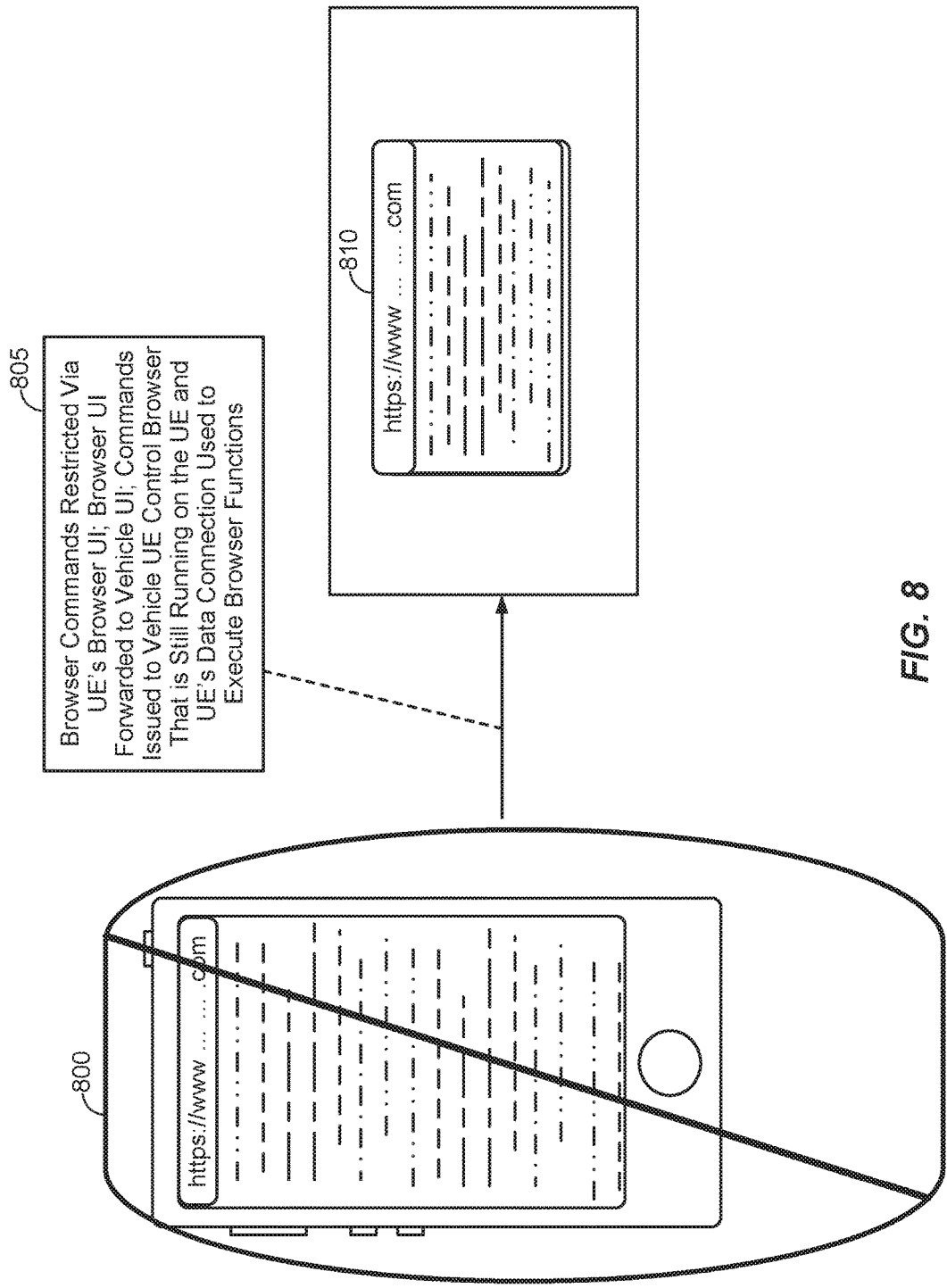
FIG. 8 illustrates an example of a UE-based UI being forwarded to a vehicle UI controller for presentation on a vehicle UI in accordance with an aspect of the disclosure.

Alternatively, if UE 750 is determined to be positioned in the driver zone 755 at 605, then UE 750 restricts the one or more UE-based UIs provisioned on UE 750 for accessing the one or more UE-based features, 615. However, instead of merely restricting the one or more UE-based UIs based on the driver zone determination at 615, UE 750 also forwards the one or more UE-based UIs to a vehicle UI controller of the vehicle 700 that is configured to control the vehicle UI 715, 620. For example, the UI forwarding that occurs at 620 can include UE 750 connecting (if necessary) to the vehicle UI controller and then sending UI-specific information related to the restricted UE-based UI(s). The vehicle UI controller receives the forwarded UE-based UI(s) at 620 and configures the vehicle UI 715 to permit access to the UE-based feature(s) based on the forwarded UE-based UI(s), 625. The vehicle UI controller does not necessarily configure the vehicle UI 715 as a clone of the restricted UE-based UIs at 625, although this is certainly possible. For example, as shown in FIG. 8 with respect to a restricted web-browsing UI, a mobile web browsing UI is blocked as shown at 800, and the mobile web browsing UI is forwarded 805 to a touchscreen interface 810 of the vehicle UI 715. However, as shown in FIG. 8, the web browsing vehicle-based UI is modified to conform to the resolution and/or aspect ratio of the touchscreen interface 810, which is different than a display screen of UE 750 in this example. Any web-browsing commands input into the web browsing vehicle-based UI are forwarded to UE 750 for processing (e.g., connecting to the Internet to actually fetch a requested web-site, etc.).

In a further example of 620 of FIG. 6, the UI forwarding can be a partial or complete handoff of the UE-based feature(s) from UE 750 to the vehicle UI controller in one or more other implementations. For example, a web-browsing application on UE 750 may forward a particular state (e.g., a current web site such as www.cnn.com) to the vehicle UI controller, and the vehicle UI 715 will then load its own vehicle-based web-browsing application to the particular state and will thereafter rely upon the vehicle's own network connection to actually download any associated data and so on. So, the forwarding of 620 does not necessarily imply that the vehicle UI 715 is simply an extension of the UE-based UI(s). Further, the intelligence behind the UE-based UI(s) can also be split between UE 750 and the vehicle UI 715. For example, in a media playback example, the media remains stored on UE 750, a media search UI is loaded onto the vehicle UI 715 for searching within the media storage on UE 750, and any media selected for playback is streamed from UE 750 to the vehicle UI controller where it is rendered for playback by the vehicle 700. Thereby, a "forwarded" UI can correspond to a mere extension of the UE-based UI(s) onto the vehicle UI 715 with the UE 750 ultimately maintaining control and responsibility for the implementation of any features, or alternatively a "forwarded" UI can correspond to a partial or complete handoff of control and/or responsibility for the implementation of any features from UE 750 to the vehicle UI controller or vehicle UI 715.

UE 750 periodically interacts with the in-vehicle location detection system to determine whether UE 750 is still positioned within the driver zone 755 of the vehicle 700, 630 (e.g., similar to 600). At 635, if UE 750 is determined to remain positioned in the driver zone 755, then the process returns to 615 and the UE-based UI(s) continue to be restricted (615) and forwarded (620) to the vehicle UI controller. Alternatively, if UE 750 is determined to no longer remain positioned in the driver zone 755 at 635, then UE 750 stops restricting the UE-based UI(s), 640, UE 750 stops forwarding the UE-based UI(s) to the vehicle UI controller, 645, and the vehicle UI controller reconfigures the vehicle UI to stop permitting access to the UE-based feature(s) using the forwarded UE-based UI(s), 650. For example, as will be understood from a review of FIG. 7, assume that UE 750 is initially positioned at Position 1 within the driver zone 755 as shown in FIG. 7, resulting in an initial driver zone determination for UE 750 at 600-605. However, UE 750 is later passed from a driver of the vehicle 700 to a passenger sitting in passenger seat 2 (or 730) and thereby moves to Position 2 outside of the driver zone 755 as shown in FIG. 7. At this point, the UE-based UI(s) would become unblocked (or unrestricted) so the passenger can access the UE-based feature(s) via the UE-based UI(s).

Figure 9:
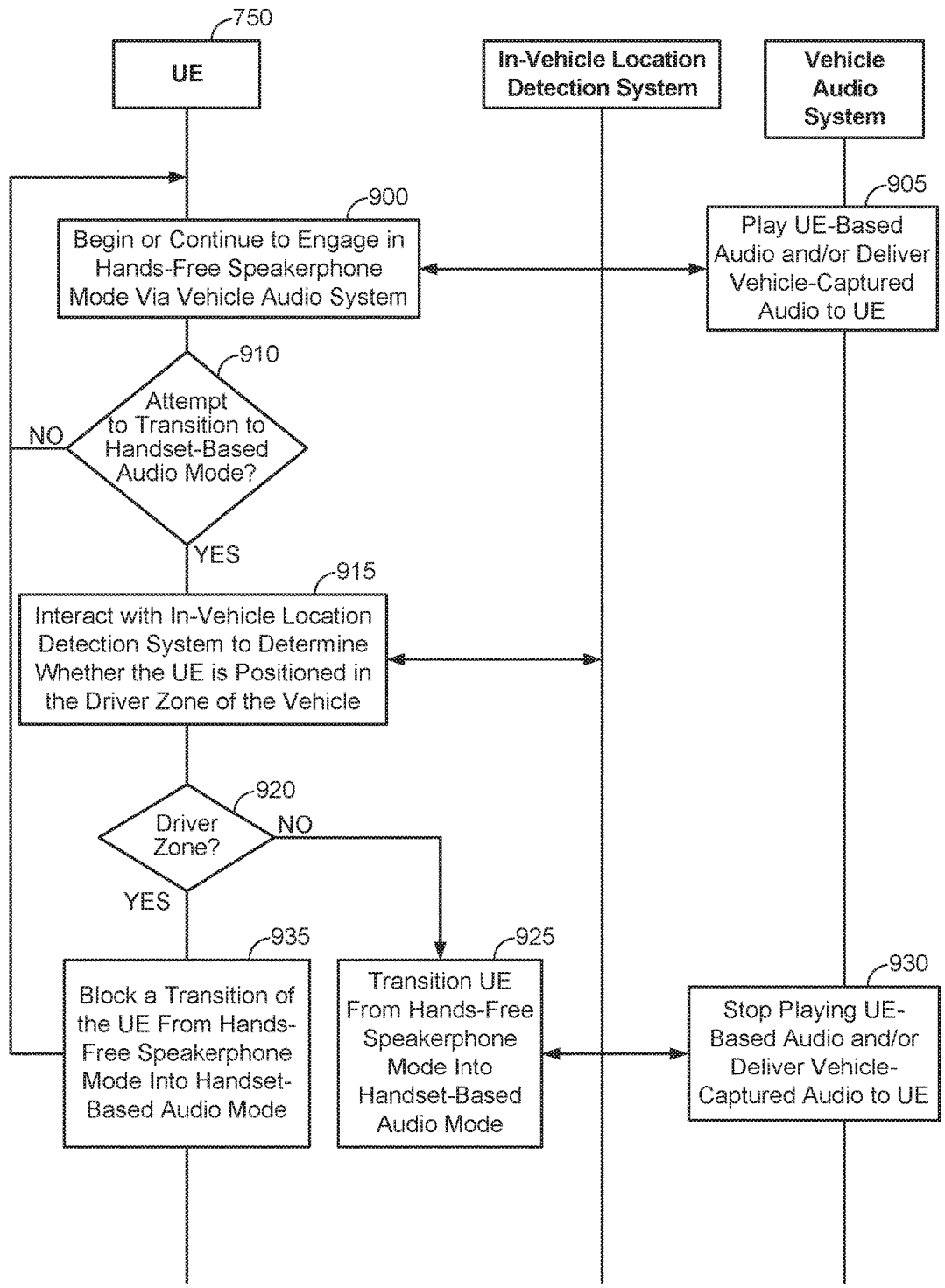
FIG. 9 illustrates a process of selectively blocking a transition out of hands-free speakerphone mode in accordance with an aspect of the disclosure.

FIG. 9 illustrates a process of selectively blocking a transition out of hands-free speakerphone mode in accordance with an aspect of the disclosure. Below, FIG. 9 is described with reference to FIG. 7, similar to FIG. 6.

With reference to FIG. 9, UE 750 begins to, or continues to, engage in hands-free speakerphone mode via the vehicle audio system of the vehicle 700, 900, and the vehicle audio system plays audio via speakers 765 and 770 that is streamed from UE 750 while capturing audio via microphone 760, 905. While engaged in hands-free speakerphone mode, UE 750 will monitor whether UE 750 detects an attempt to transition UE 750 from the hands-free speakerphone mode into handset-based audio mode, 910. For example, 910 can include monitoring whether UE 750 is being moved into proximity of an operator's ear, which can be interpreted as indicative of a desire of the operator to speak into the UE's microphone instead of the microphone 760. Ear-proximity detection of UEs is well-known in the art and involves one or more proximity sensors that can be deployed on UEs such as UE 750, and as such will not be discussed further for the sake of brevity. If UE 750 determines that there is no detected attempt to transition into handset-based audio mode at 910, the process returns to 900 and UE 750 continues in hands-free speakerphone mode via the vehicle audio system. Otherwise, if UE 750 determines that UE 750 has detected an attempt to transition into handset-based audio mode at 910, instead of merely switching from hands-free speakerphone mode to handset-based audio mode (e.g., whereby UE 750's speakers 765 and 770 and microphone 760 are used to handle the call instead of the vehicle audio system), UE 750 interacts with an in-vehicle location detection system (e.g., such as the Bluetooth in-vehicle location detection system described above with respect to FIG. 5) to determine whether UE 750 is positioned in the driver zone 755 of the vehicle 700, 915 (e.g., similar to 600 and/or 630 of FIG. 6).

At 920, if UE 750 is determined not to be positioned in the driver zone 755, then UE 750 transitions from hands-free speakerphone mode into handset-based audio mode, 925, and the vehicle audio system stops playing audio that is streamed from UE 750 and/or delivering microphone-captured audio to UE 750, 930. Alternatively, if UE 750 is determined to be positioned in the driver zone 755, then UE 750 blocks the transition from hands-free speakerphone mode into handset-based audio mode, 935, and the process returns to 900 where UE 750 continues in hands-free speakerphone mode. As will be appreciated, even if the operator of UE 750 wants to hold UE 750 to his/her ear and speak directly into it, the operator in the process of FIG. 9 is forced to use hands-free speakerphone mode so long as UE 750 remains positioned in the driver zone 755.

Figure 10:
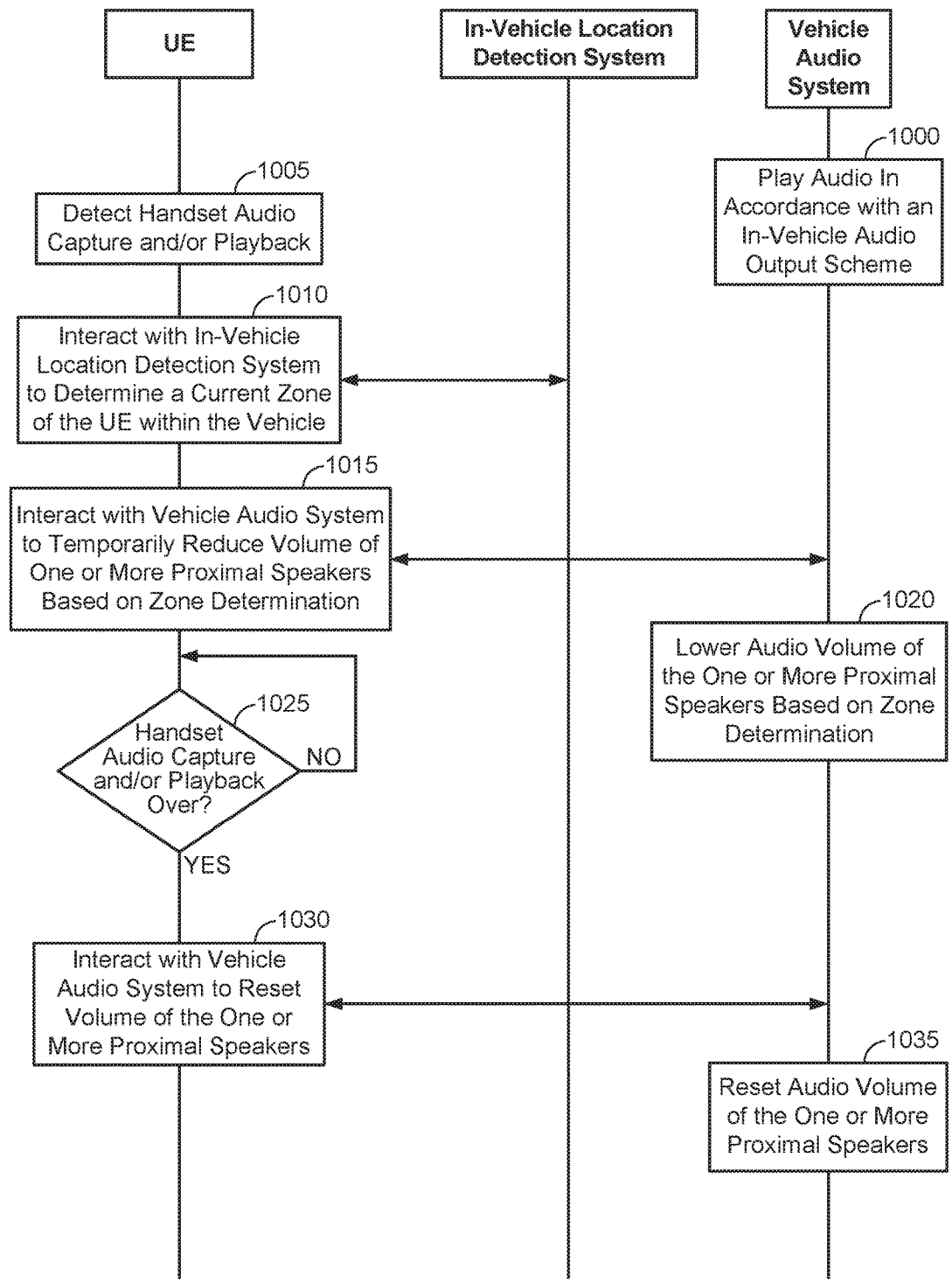
FIG. 10 illustrates a process of selectively reducing volume in a vehicle in accordance with an aspect of the disclosure.
Figure 11:
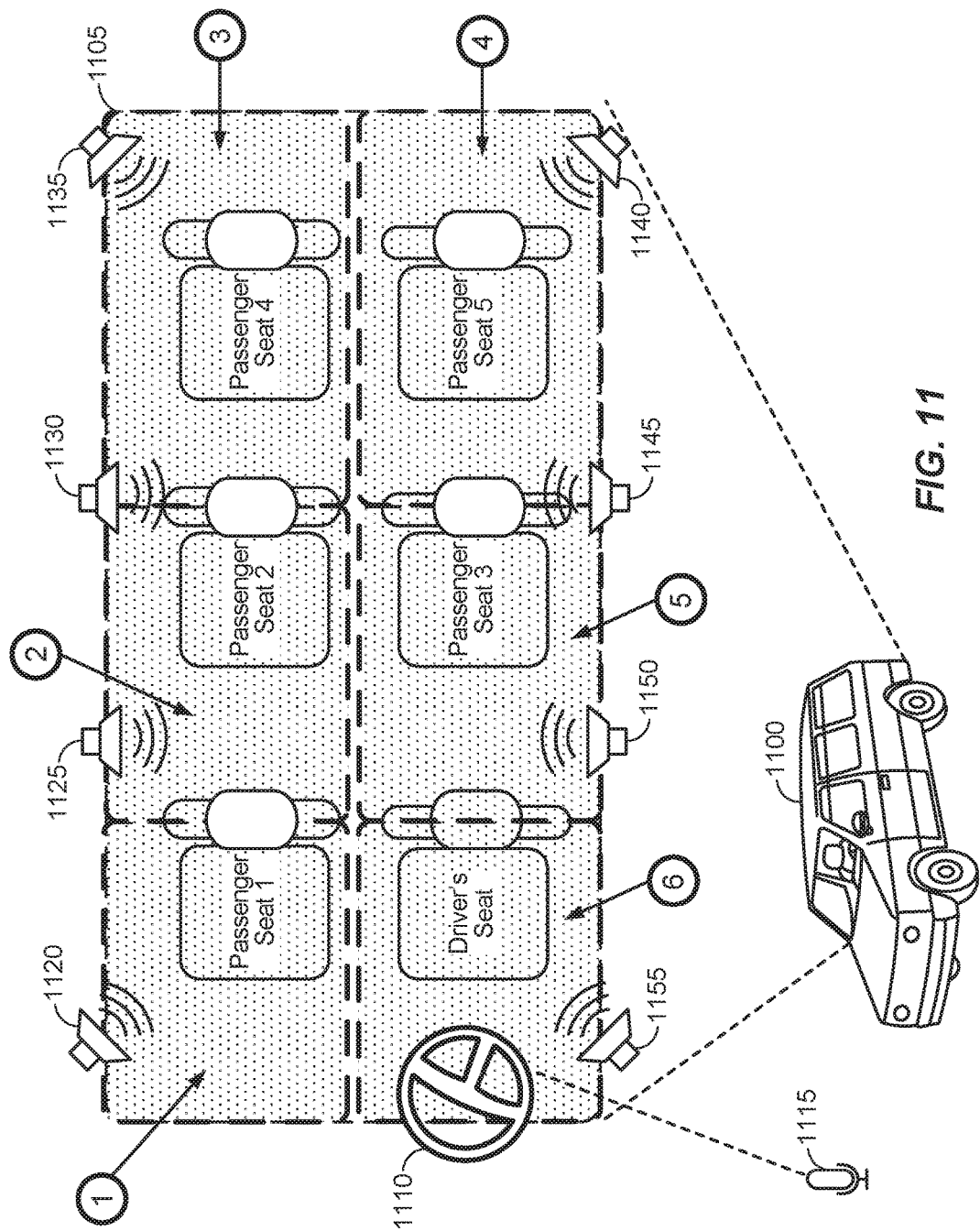
FIG. 11 illustrates a vehicle with another in-vehicle configuration in accordance with an aspect of the disclosure.

FIG. 10 illustrates a process of selectively reducing volume in a vehicle in accordance with an aspect of the disclosure. Below, FIG. 10 is described with reference to FIG. 11. FIG. 11 illustrates a vehicle 1100 that is configured similarly to the vehicle 500 of FIG. 5 or vehicle 700 of FIG. 7. However, in FIG. 11, certain aspects from vehicles 500 and/or 700 are either omitted or not explicitly referenced as part of in-vehicle configuration 1105, such as an in-vehicle location detection system (e.g., the Bluetooth transceivers 550 through 595 from FIG. 5), the vehicle UI 715 of FIG. 7, and so on. While not illustrated explicitly, these omitted aspects are optionally part of the in-vehicle configuration 1105. With reference to FIG. 11, the in-vehicle configuration 1105 includes steering wheel 1110, a microphone 1115 and a plurality of speakers 1120 through 1155. The microphone 1115 and the plurality of speakers 1120 through 1155 collectively correspond to part of a vehicle audio system for the vehicle 1100. Also, as shown in FIG. 11, the in-vehicle configuration 1105 is divided into zones labeled as zones 1 through 6, whereby zone 1 is a passenger zone for a front passenger, zone 2 is a passenger zone for a middle-right passenger, and so on.

With reference to FIG. 10, assume that the vehicle audio system is playing audio in accordance with an in-vehicle audio output scheme at 1000. For example, at 1000, the vehicle audio system may be playing music, a phone call conversation involving a driver of the vehicle 1000, and so on. At 1005, while the audio continues to be played at 1000, a given UE detects handset audio capture and/or playback at a given UE in the vehicle 1100 (e.g., an incoming call arriving at the given UE, a call originated by the given UE, a YouTube video being played at the given UE, activation of an audio recording function on the given UE such as the given UE turning on an audio capture mode for a call or voice memo function, etc.). In response to the handset audio capture and/or playback detection from 1005, the given UE interacts with an in-vehicle location detection system (e.g., such as the Bluetooth in-vehicle location detection system described above with respect to FIG. 5) to determine a current zone in which the given UE is positioned, 1010. For example, similar to the discussion above with respect to FIG. 5, in 1010, Bluetooth signals can be exchanged between a Bluetooth transceiver on the given UE and the Bluetooth transceivers 550 through 595 in order to calculate the relative in-vehicle position of the given UE within the vehicle 1100. The relative in-vehicle location can then be evaluated to determine which of zones 1 through 6 from FIG. 11 that the relative in-vehicle location falls within.

At 1015, the given UE interacts with the vehicle audio system to temporarily reduce volume of one or more proximal speakers that are mapped to the determined zone from 1010. For example, the given UE can report its determined zone to the vehicle audio system and identify which proximal speakers to target for sound reduction (or even muting), or alternatively the given UE can look up the proximal speakers to target for sound reduction and ask the vehicle audio system to reduce (or even mute) sound for those particular speakers. In either case, the vehicle audio system lowers audio volume being output by the one or more proximal speakers based on the zone determination, 1020. In an example, with reference to FIG. 11, if the given UE is operated by a user seated in passenger seat 3 within zone 5, the proximal speakers targeted for sound reduction may include a set of speakers such as 1145 and 1150, if the given UE is operated by another user seated in passenger seat 5 within zone 4, the proximal speakers targeted for sound reduction may include speakers 1140 and 1145, and so on. As will be appreciated, the proximal speakers mapped to a particular zone may be dependent on the audio characteristics of the in-vehicle configuration 1105. Further, the volume reduction for each proximal speaker may be based on one or more volume reduction parameters. The one or more volume reduction parameters may include an expected impact of sound upon the particular zone, a volume level prior to the temporary reduction, and/or a target volume level for the one or more proximal speakers during handset-based audio capture and/or playback within the particular zone. In a further example, different proximal speakers may be targeted with different degrees of sound reduction (e.g., for a zone 2 reduction, speaker 1150 may be reduced by 10% while speaker 1125 is reduced by 25% because speaker 1125 emits more volume into zone 2, and so on). Also, the sound reduction can be implemented as an absolute reduction or a relative reduction (e.g., if the proximal speakers include a first speaker emitting high volume and a second speaker emitting low volume based on the in-vehicle audio output scheme prior to the detection of 1005, then it is possible that only the first speaker will have its sound reduced at 1020 because the second speaker is already below a target volume threshold for the sound reduction).

At 1025, the given UE determines whether the handset audio capture and/or playback is over. If not, the one or more proximal speakers continue to emit the lower audio volume in 1020. Otherwise, if the given UE determines that the handset audio capture and/or playback is over at 1025, the given UE interacts with the vehicle audio system to reset the volume output by the one or more proximal speakers to its previous level(s), 1030, and the vehicle audio system implements the volume reset such that the one or more proximal speakers once again output audio in accordance with the in-vehicle audio output scheme, 1035.

Figure 12:
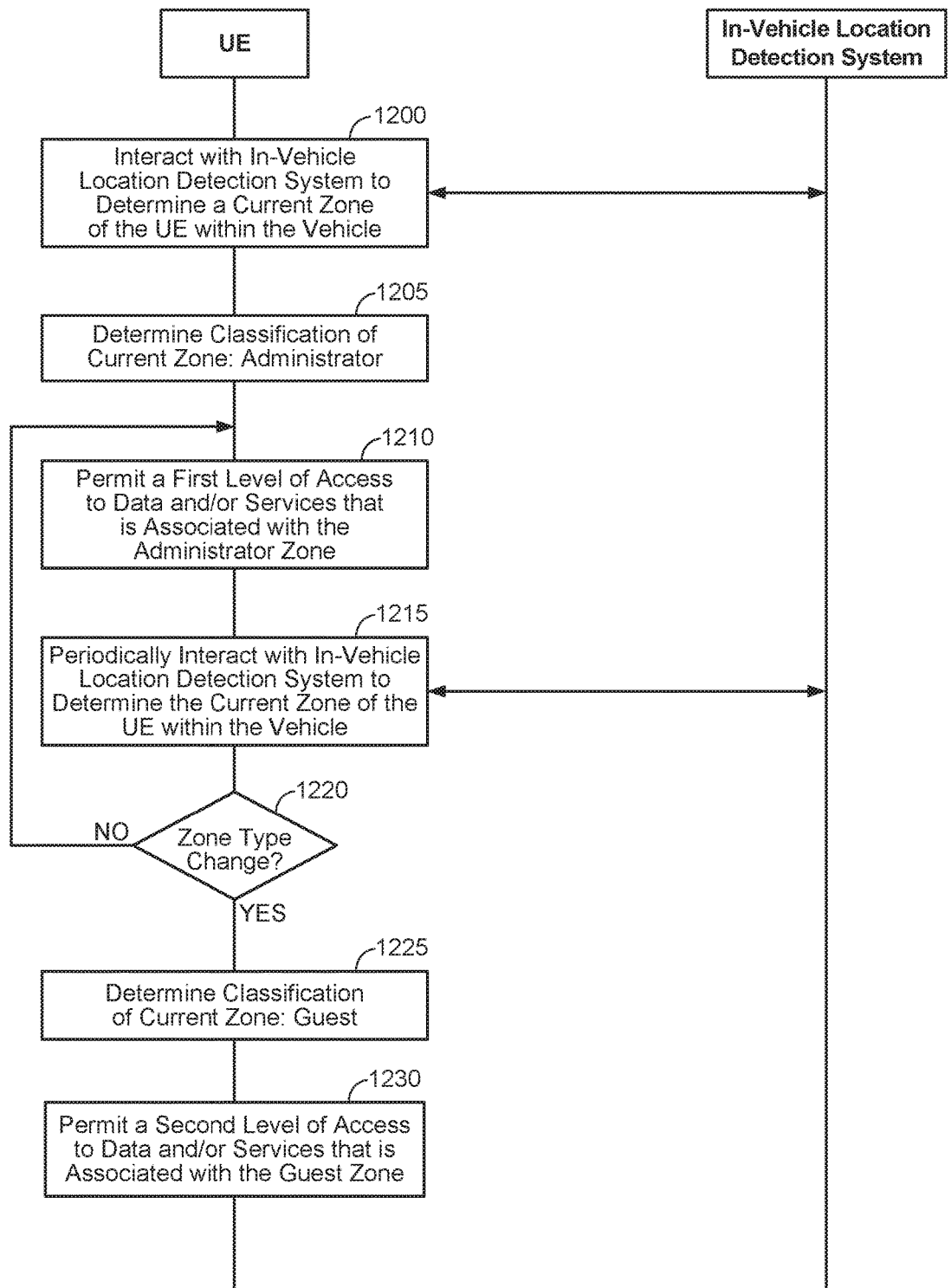
FIG. 12 illustrates a process of providing different levels of access to data and/or services based on in-vehicle location in accordance with an aspect of the disclosure.

FIG. 12 illustrates a process of providing different levels of access to data and/or services based on in-vehicle location in accordance with an aspect of the disclosure. Similar to FIG. 10, FIG. 12 is described with reference to FIG. 11. In FIG. 12, assume that the zones 1 through 6 from FIG. 11 are further characterized as corresponding to either an administrator zone or a guest zone. In the administrator zone, a first level access to data and/or services for a given UE is permitted (e.g., full access or unrestricted access, except for driver zone safety restrictions if positioned in a driver zone), and in the guest zone, a second level access to data and/or services for the given UE is permitted (e.g., reduced access or restricted access). While not illustrated explicitly in FIG. 12, it is also possible that different tiers of guest zones can be implemented such as three or more levels of access are implemented (e.g., administrator zones are "adult" zones, first guest zones are for children between the ages of 13-17, second guest zones are for children between the ages of 3-12, and so on).

Referring to FIG. 12, the given UE interacts with an in-vehicle location detection system (e.g., such as the Bluetooth in-vehicle location detection system described above with respect to FIG. 5) to determine a current zone in which the given UE is positioned, 1200. For example, similar to the discussion above with respect to FIG. 5, in 1200, Bluetooth signals can be exchanged between a Bluetooth transceiver on the given UE and the Bluetooth transceivers 550 through 595 in order to calculate the relative in-vehicle position of the given UE within the vehicle 1100. The relative in-vehicle location can then be evaluated to determine which of zones 1 through 6 from FIG. 11 that the relative in-vehicle location falls within.

In the example of FIG. 12, assume that the given UE determines its current zone to be an administrator zone in 1205 (e.g., the driver zone or zone 6, zone 1 where an adult is expected to sit, etc.). Accordingly, the given UE permits the first level of access to data and/or services that is associated with the administrator zone, 1210. For example, at 1210, the given UE may permit unrestricted access to web sites via a mobile web browser, access to financial information or documents stored on the given UE, auto-saved passwords may be accessible to permit quick log-ins to mobile applications and/or web sites, and so on.

The given UE continues to periodically monitor its current zone via the in-vehicle location detection system, 1215. If a classification (e.g., administrator zone or guest zone) of the current zone of the given UE is determined to be unchanged at 1220, then the process returns to 1210 and the given UE continues to permit the first level of access to data and/or services. As will be appreciated, the zone itself can change without the zone classification (or type) being changed, so the given UE can be passed from one administrator zone to another while providing continuous first-level access to the data and/or services. Otherwise, if the classification of the current zone of the given UE is determined to be different at 1220 (e.g., the given UE was passed by a parent in zone 1 to a child sitting in zone 2 or zone 3), the process advances to 1225. At 1225, assume that the given UE determines its new zone classification (or zone type) is a guest zone and is no longer an administrator zone. Accordingly, the given UE switches its permission structure so as to permit the second level of access to data and/or services that is associated with the guest zone, 1230. For example, at 1230, the given UE may permit restricted access only to child-safe web sites via a mobile web browser, access to financial information or documents stored on the given UE may be blocked, auto-saved passwords may not be accessible so that a parent or supervisor is required to enter passwords on behalf of the subordinate operator, and so on. As will be appreciated from a review of FIG. 12, an administrative operator can customize the zone configuration (e.g., which zones are administrator zones, which zones are guest zones of various guest zone tiers or levels, etc.) so that group-specific (e.g., for particular families, etc.) zone configurations can be implemented.

Figure 13:
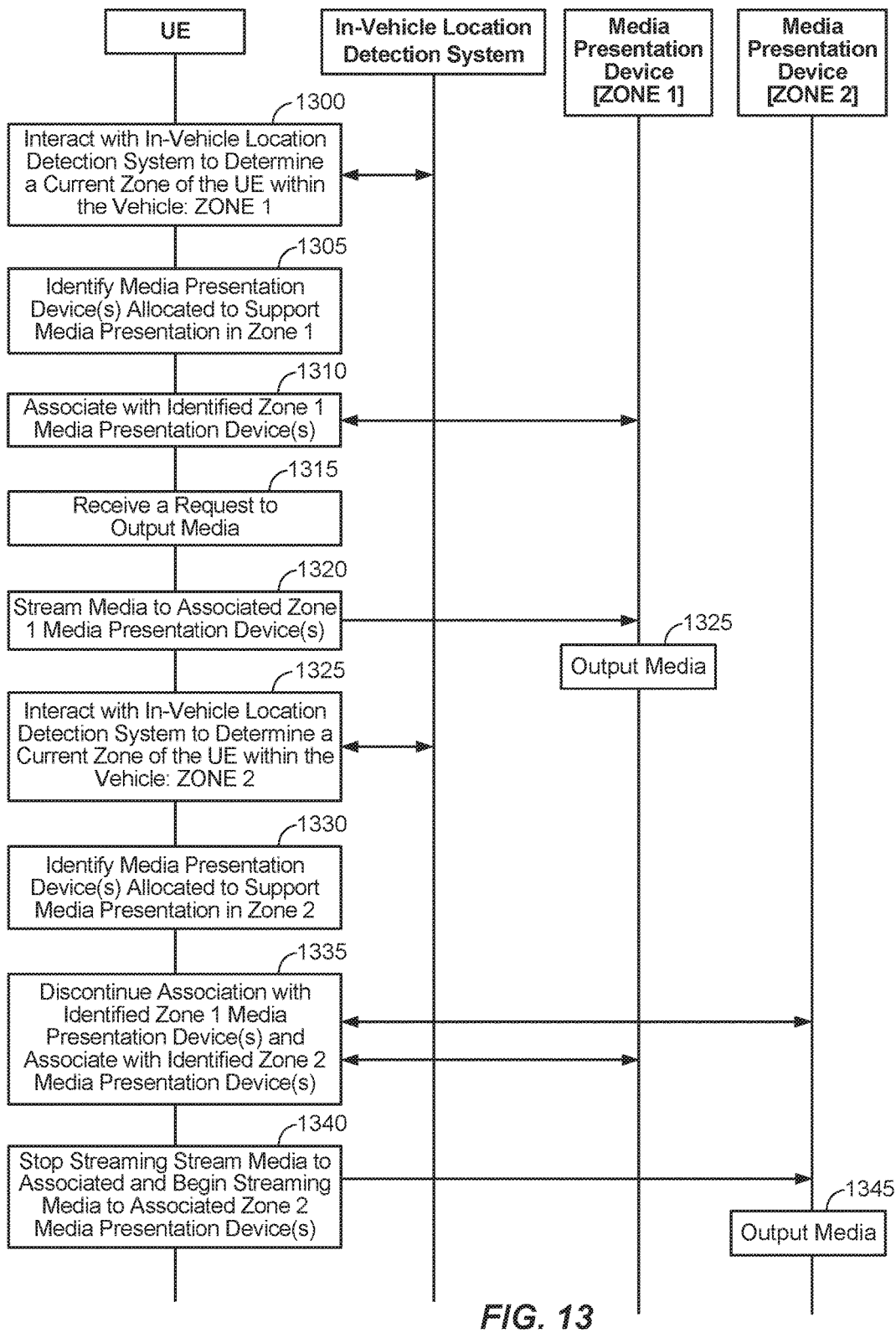
FIG. 13 illustrates a process of outputting media in a vehicle in accordance with an aspect of the disclosure.
Figure 14:
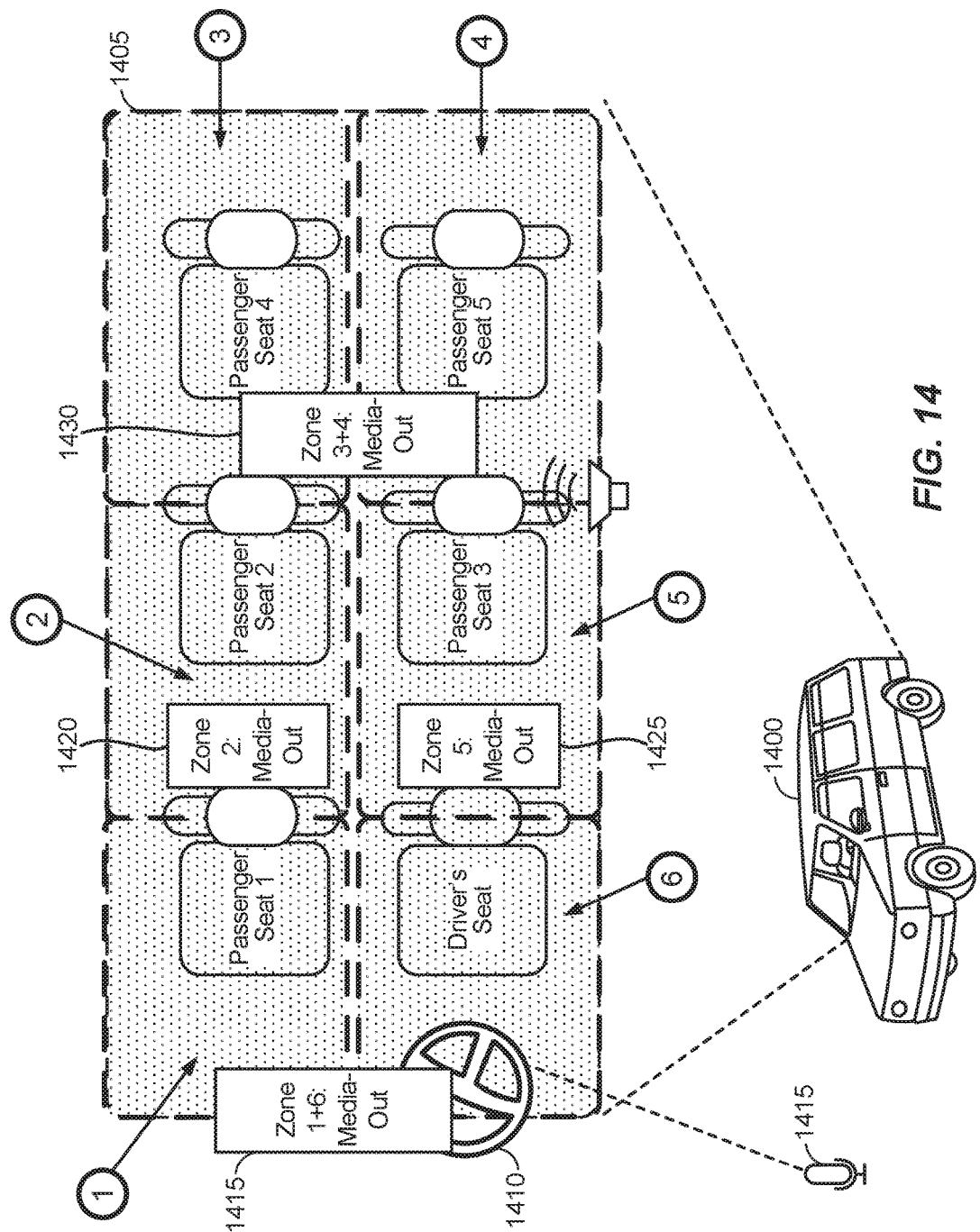
FIG. 14 illustrates a vehicle with another in-vehicle configuration in accordance with an aspect of the disclosure.

FIG. 13 illustrates a process of outputting media in a vehicle in accordance with an aspect of the disclosure. Below, FIG. 13 is described with reference to FIG. 14. In FIG. 14, the vehicle 1400 is similar in some respects to FIG. 11, whereby 1410 and 1413 correspond to 1110 and 1115 of FIG. 11, respectively, and in-vehicle configuration 1405 is configured with zones 1 through 6. However, in FIG. 14, the vehicle 1400 is further provisioned with media presentation (or output) devices 1415 through 1430. In an example, the media presentation devices 1415 and 1430 can be implemented as display screens that are provided to display images and/or video to users positioned in particular zones. For example, media presentation device 1415 is configured to support (or mapped to) zones 1 and 6 (e.g., the driver zone and the front-right passenger zone), media presentation device 1420 is configured to support (or mapped to) zone 2, media presentation device 1425 is configured to support (or mapped to) zone 5 and media presentation device 1430 is mapped to zones 3 and 4.

With reference to FIG. 13, a given UE interacts with an in-vehicle location detection system (e.g., such as the Bluetooth in-vehicle location detection system described above with respect to FIG. 5) to determine a current zone in which the given UE is positioned, 1300. For convenience of description, assume that the current zone of the given UE is determined to be zone 1 at 1300. The given UE identifies the media presentation device 1415 being mapped to zone 1 at 1305, and the given UE associates with the media presentation device 1415, 1310. For example, at 1310, the given UE may form a connection to the media presentation device 1415, the given UE may determine the display capability (e.g., resolution, aspect ratio, etc.) of the media presentation device 1415, etc. At some later point in time, the given UE receives a request to output media (e.g., a YouTube video, a Netflix movie, etc.) within zone 1, 1315. At this point, due to the zone-specific association from 1310, the given UE formats the media for presentation by the media presentation device 1415 and then streams the formatted media to the media presentation device 1415, 1320, and the media presentation device 1415 outputs the media, 1323.

The given UE continues to periodically monitor its current zone via the in-vehicle location detection system, 1325. For convenience of description, assume that the given UE detects that its zone has changed from zone 1 to zone 2 at 1325 (e.g., a user of the given UE in zone 1 has passed the given UE to a different user seated in zone 2, a user seated in zone 1 changed his/her seat position and is now seated in zone 2, etc.). The given UE identifies the media presentation device 1420 being mapped to zone 2 at 1330, and the given UE discontinues its association with the media presentation device 1415 that is mapped to zone 1 and establishes an association with the media presentation device 1420, 1335. At this point, the given UE stops streaming the media to the media presentation device 1415 and begins to stream the media to the media presentation device 1420, 1340, and the media presentation device 1420 outputs the media, 1345. As will be appreciated, if the given UE determines that the media presentation device 1420 has different display capabilities as compared to the media presentation device 1415 (e.g., higher resolution, etc.), the media streamed at 1340 may be formatted differently than the media streamed previously at 1320.

Figure 15:
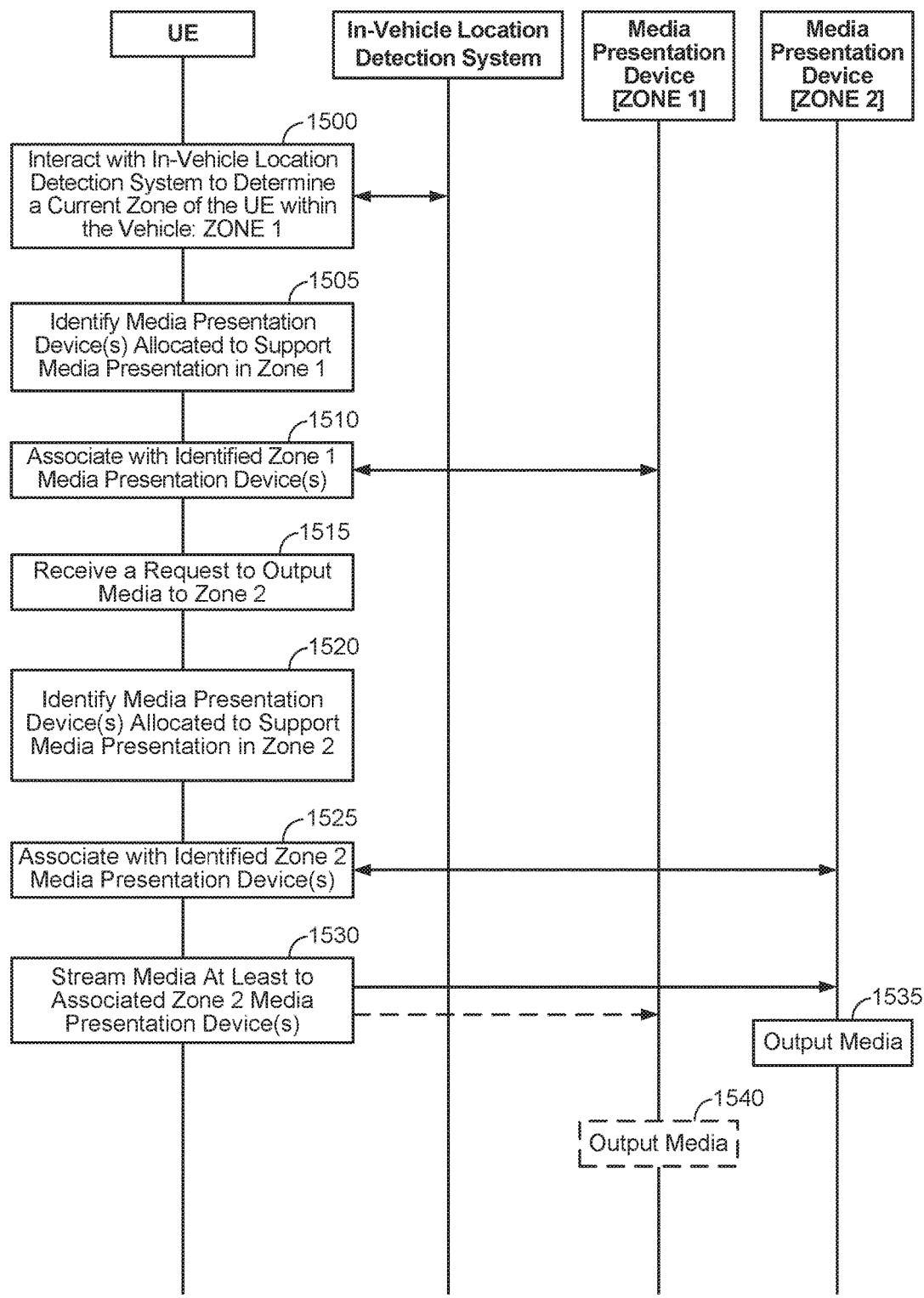
FIG. 15 illustrates another process of outputting media in a vehicle in accordance with an aspect of the disclosure.

FIG. 15 illustrates another process of outputting media in a vehicle in accordance with an aspect of the disclosure. Similar to FIG. 13, FIG. 15 is described with reference to FIG. 14. With reference to FIG. 15, 1500 through 1510 substantially correspond to 1300 through 1310 of FIG. 13, respectively, and will not be described further for the sake of brevity. At 1515, instead of the given UE receiving a request to output media (e.g., a YouTube video, a Netflix movie, etc.) in its current zone (i.e., zone 1) as in 1315 of FIG. 13, the given UE receives a request to output media in a different zone (i.e., zone 2). For example, 1515 may result from a parent sitting in zone 1 desiring to share a video or movie with a child sitting in zone 2. Optionally, the request of 1515 may also be accompanied by an explicit or implicit request for the media to be output in zone 1 as well (e.g., via media presentation device 1415) and/or other zones.

In response to the request from 1515, the given UE identifies the media presentation device 1420 being mapped to zone 2 at 1520, and the given UE in zone 1 associates with the media presentation device 1420 that is mapped to zone 2, 1525. For example, at 1525, the given UE may form a connection to the media presentation device 1420, the given UE may determine the display capability (e.g., resolution, aspect ratio, etc.) of the media presentation device 1420, etc. Based on the zone-specific association from 1525, the given UE formats the media for presentation by the media presentation device 1420 and then streams the formatted media to the media presentation device 1420, 1530, and the media presentation device 1420 outputs the media, 1535. As noted above, if requested, the media can also be streamed to the media presentation device 1415 in the given UE's current zone, as shown by optional dotted line 1530 and 1540 (e.g., and also other zones, not shown).

Figure 16:
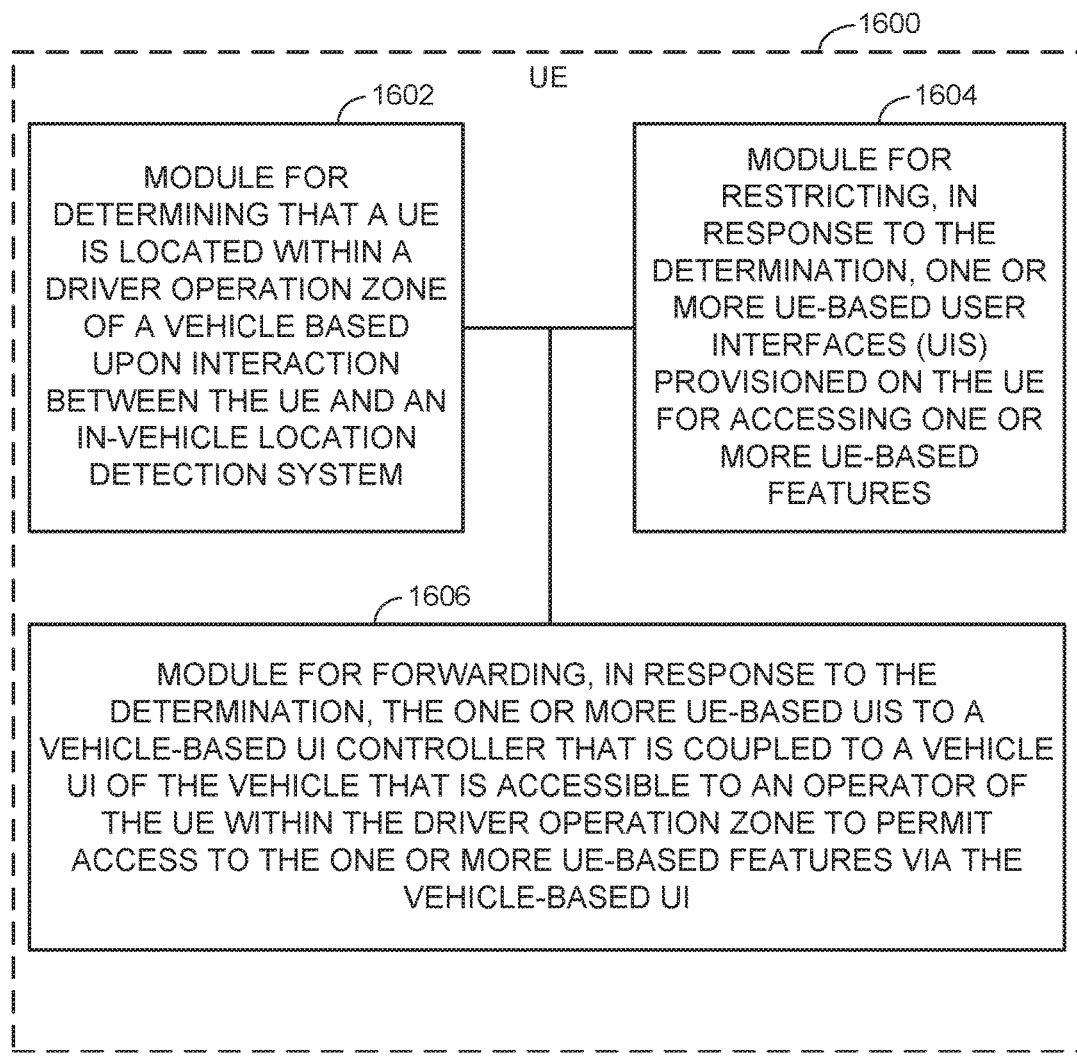
FIG. 16 illustrates an example UE represented as a series of interrelated functional modules.

FIG. 16 illustrates an example UE 1600 represented as a series of interrelated functional modules. A module for determining that the UE is located within the driver operation zone of the vehicle based upon interaction between the UE and an in-vehicle location detection system 1602 may correspond at least in some aspects to, for example, a logic configured to receive and/or transmit information 305 as discussed herein. A module for restricting, in response to the determination, one or more UE-based UIs provisioned on the UE for accessing one or more UE-based features 1604 may correspond at least in some aspects to, for example, a logic configured to process information 310 as discussed herein. A module for forwarding, in response to the determination, the one or more UE-based UIs to a vehicle-based UI controller that is coupled to a vehicle UI of the vehicle that is accessible to an operator of the UE within the driver operation zone to permit access to the one or more UE-based features via the vehicle-based UI 1606 may correspond at least in some aspects to, for example, a logic configured to receive and/or transmit information 305 as discussed herein.

Figure 17:
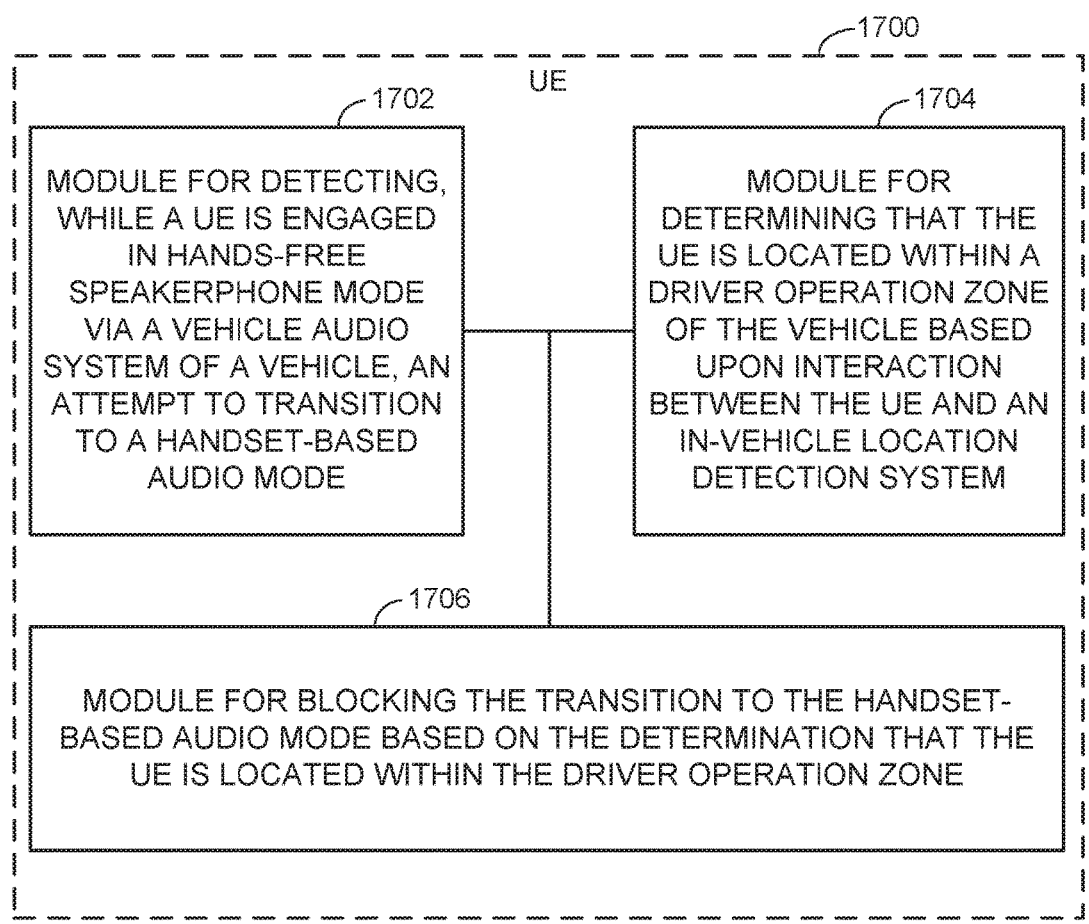
FIG. 17 illustrates another example UE represented as a series of interrelated functional modules.

FIG. 17 illustrates an example UE 1700 represented as a series of interrelated functional modules. A module for detecting, while the UE is engaged in hands-free speakerphone mode via a vehicle audio system of a vehicle, an attempt to transition to a handset-based audio mode 1702 may correspond at least in some aspects to, for example, a logic configured to process information 310 as discussed herein. A module for determining that the UE is located within a driver operation zone of the vehicle based upon interaction between the UE and an in-vehicle location detection system 1704 may correspond at least in some aspects to, for example, a logic configured to receive and/or transmit information 305 as discussed herein. A module for blocking the transition to the handset-based audio mode based on the determination that the UE is located within the driver operation zone 1706 may correspond at least in some aspects to, for example, a logic configured to receive local user input 325 as discussed herein.

Figure 18:
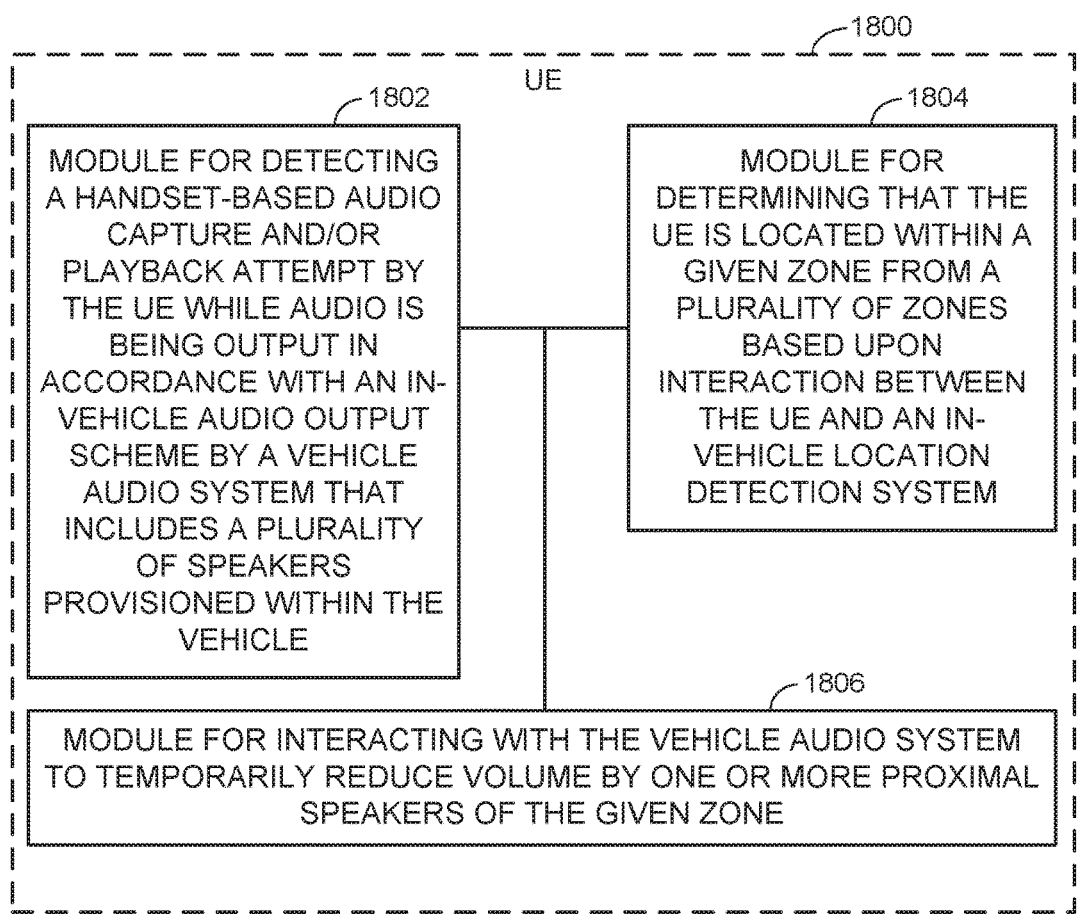
FIG. 18 illustrates another example UE represented as a series of interrelated functional modules.

FIG. 18 illustrates an example UE 1800 represented as a series of interrelated functional modules. A module for detecting a handset-based audio capture and/or playback attempt by the UE while audio is being output in accordance with an in-vehicle audio output scheme by a vehicle audio system that includes a plurality of speakers provisioned within a vehicle 1802 may correspond at least in some aspects to, for example, a logic configured to process information 310 as discussed herein. A module for determining that the UE is located within a given zone from a plurality of zones based upon interaction between the UE and an in-vehicle location detection system 1804 may correspond at least in some aspects to, for example, a logic configured to receive and/or transmit information 305 as discussed herein. A module for interacting with the vehicle audio system to temporarily reduce volume by one or more proximal speakers of the given zone 1806 may correspond at least in some aspects to, for example, a logic configured to receive and/or transmit information 305 as discussed herein.

Figure 19:
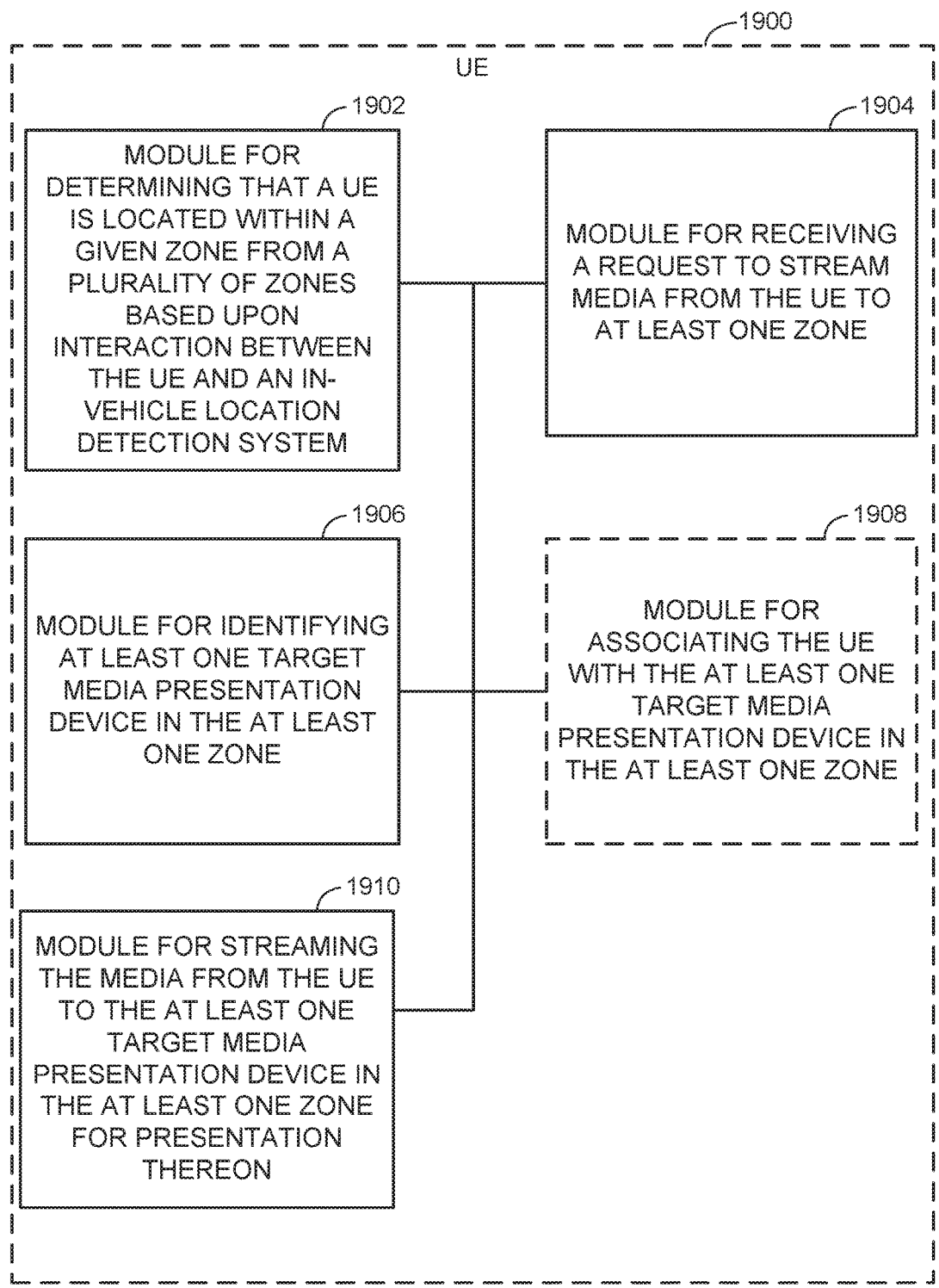
FIG. 19 illustrates another example UE represented as a series of interrelated functional modules.

FIG. 19 illustrates an example UE 1900 represented as a series of interrelated functional modules. A module for determining that the UE is located within a given zone from a plurality of zones based upon interaction between the UE and an in-vehicle location detection system 1902 may correspond at least in some aspects to, for example, a logic configured to receive and/or transmit information 305 as discussed herein. A module for receiving a request to stream media from the UE to at least one zone 1904 may correspond at least in some aspects to, for example, a logic configured to receive and/or transmit information 305 as discussed herein. A module for identifying at least one target media presentation device in the at least one zone 1906 may correspond at least in some aspects to, for example, a logic configured to process information 310 as discussed herein. A module for associating the UE with the at least one target media presentation device in the at least one zone 1908 may correspond at least in some aspects to, for example, a logic configured to receive and/or transmit information 305 as discussed herein. A module for streaming the media from the UE to the at least one target media presentation device in the at least one zone for presentation thereon 1910 may correspond at least in some aspects to, for example, a logic configured to receive and/or transmit information 305 as discussed herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Accordingly, an aspect of the disclosure can include a computer readable medium embodying a method for operating a UE within a vehicle with an in-vehicle configuration that includes a driver operation zone, including determining that the UE is located within the driver operation zone of the vehicle based upon interaction between the UE and an in-vehicle location detection system, restricting, in response to the determination, one or more UE-based user interfaces (UIs) provisioned on the UE for accessing one or more UE-based features and forwarding, in response to the determination, the one or more UE-based UIs to a vehicle-based UI controller that is coupled to a vehicle UI of the vehicle that is accessible to an operator of the UE within the driver operation zone to permit access to the one or more UE-based features via the vehicle-based UI.

Another aspect of the disclosure can include a computer readable medium embodying a method for operating a UE within a vehicle with an in-vehicle configuration that includes a driver operation zone, including detecting, while the UE is engaged in hands-free speakerphone mode via a vehicle audio system of the vehicle, an attempt to transition to a handset-based audio mode, determining that the UE is located within the driver operation zone of the vehicle based upon interaction between the UE and an in-vehicle location detection system and blocking the transition to the handset-based audio mode based on the determination that the UE is located within the driver operation zone Another aspect of the disclosure can include a computer readable medium embodying a method for operating a UE within a vehicle with an in-vehicle configuration including a plurality of zones, including detecting a handset-based audio capture and/or playback attempt by the UE while audio is being output in accordance with an in-vehicle audio output scheme by a vehicle audio system that includes a plurality of speakers provisioned within the vehicle, determining that the UE is located within a given zone from the plurality of zones based upon interaction between the UE and an in-vehicle location detection system and interacting with the vehicle audio system to temporarily reduce volume by one or more proximal speakers of the given zone.

Another aspect of the disclosure can include a computer readable medium embodying a method for operating a UE within a vehicle with an in-vehicle configuration that includes a plurality of zones that each include at least one media presentation device, including determining that the UE is located within a given zone from the plurality of zones based upon interaction between the UE and an in-vehicle location detection system, receiving a request to stream media from the UE to at least one zone, identifying at least one target media presentation device in the at least one zone, associating the UE with the at least one target media presentation device in the at least one zone and streaming the media from the UE to the at least one target media presentation device in the at least one zone for presentation thereon. Accordingly, the disclosure is not limited to the illustrated examples.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a user equipment (UE) within a vehicle with an in-vehicle configuration that includes a driver operation zone, comprising:
    determining that the UE is located within the driver operation zone of the vehicle based upon interaction between the UE and an in-vehicle location detection system;
    restricting, in response to the determination, one or more UE-based user interfaces (UIs) provisioned on the UE for accessing one or more UE-based features;
    forwarding, in response to the determination, the one or more UE-based UIs to a vehicle-based UI controller that is coupled to a vehicle-based UI of the vehicle that is accessible to an operator of the UE within the driver operation zone to permit access to the one or more UE-based features via the vehicle-based UI;
    detecting, while the UE is engaged in hands-free speakerphone mode via a vehicle audio system of the vehicle, an attempt to transition to a handset-based audio mode; and
    blocking the transition to the handset-based audio mode based on the determination that the UE is located within the driver operation zone, wherein the detected attempt to transition to the handset-based audio mode corresponds to the UE being detected in proximity to an ear of an operator of the UE.

2. The method of claim 1,
    wherein the in-vehicle location detection system includes a plurality of Bluetooth transceivers deployed throughout the vehicle, and
    wherein the determining determines that the UE is located within the driver operation zone of the vehicle based upon a Bluetooth Low Energy (BTLE) Received Signal Strength Indicator (RSSI) between the UE and at least one of the plurality of Bluetooth transceivers.

3. The method of claim 1, wherein the determining includes:
- partitioning an interior area of the vehicle into the driver operation zone and at least one non-driver operation zone,
- determining a relative position of the UE within the interior area based upon the interaction between the UE and the in-vehicle location detection system, and
- detecting that the determined relative position of the UE within the interior area is inside of the partitioned area corresponding to the driver operation zone.

4. The method of claim 1, wherein the one or more UE-based features includes a web-browsing feature and/or a texting feature.

5. The method of claim 1, wherein the forwarding is configured to permit the one or more UE-based UIs to be modified for presentation by the vehicle-based UI.

6. The method of claim 1, further comprising:
- detecting that the UE has exited the driver operation zone of the vehicle and entered into a non-driver operation zone of the vehicle;
- removing the restriction of the one or more UE-based UIs in response to the detection; and
- stopping the forwarding of the one or more UE-based UIs in response to the detection.

7. The method of claim 1,
- wherein the forwarding forwards the one or more UE-based UIs to the vehicle-based UI controller while retaining control over the one or more UE-based features at the UE, or
- wherein the forwarding forwards the one or more UE-based UIs to the vehicle-based UI controller while splitting control over the one or more UE-based features between the UE and the vehicle-based UI controller, or
- wherein the forwarding forwards the one or more UE-based UIs to the vehicle-based UI controller by handing off control of the one or more UE-based features from the UE to the vehicle-based UI controller such that the UE is not responsible for processing of the one or more UE-based features after the handoff.

8. The method of claim 1, further comprising:
- permitting a first level of access to data and/or services via the UE based on determining that the UE is located within the driver operation zone of the vehicle, wherein the first level of access to the data and/or services is different from a second level of access to the data and/or services via the UE if the UE is outside the driver operation zone of the vehicle.

9. A user equipment (UE) within a vehicle with an in-vehicle configuration that includes a driver operation zone, comprising:
- a memory; and
- a processor coupled with the memory and configured with processor-executable instructions to perform operations comprising:
  - determining that the UE is located within the driver operation zone of the vehicle based upon interaction between the UE and an in-vehicle location detection system;
  - restricting, in response to the determination, one or more UE-based user interfaces (UIs) provisioned on the UE for accessing one or more UE-based features; and
  - forwarding, in response to the determination, the one or more UE-based UIs to a vehicle-based UI controller that is coupled to a vehicle-based UI of the vehicle that is accessible to an operator of the UE within the driver operation zone to permit access to the one or more UE-based features via the vehicle-based UI;
  - detecting, while the UE is engaged in hands-free speakerphone mode via a vehicle audio system of the vehicle, an attempt to transition to a handset-based audio mode;
  - blocking the transition to the handset-based audio mode based on the determination that the UE is located within the driver operation zone, wherein the detected attempt to transition to the handset-based audio mode corresponds to the UE being detected in proximity to an ear of an operator of the UE.

10. The user equipment of claim 9,
- wherein the in-vehicle location detection system includes a plurality of Bluetooth transceivers deployed throughout the vehicle, and
- wherein the determining determines that the UE is located within the driver operation zone of the vehicle based upon a Bluetooth Low Energy (BTLE) Received Signal Strength Indicator (RSSI) between the UE and at least one of the plurality of Bluetooth transceivers.

11. The user equipment of claim 9, wherein the determining includes:
- partitioning an interior area of the vehicle into the driver operation zone and at least one non-driver operation zone,
- determining a relative position of the UE within the interior area based upon the interaction between the UE and the in-vehicle location detection system, and
- detecting that the determined relative position of the UE within the interior area is inside of the partitioned area corresponding to the driver operation zone.

12. The user equipment of claim 9, further comprising:
- detecting that the UE has exited the driver operation zone of the vehicle and entered into a non-driver operation zone of the vehicle;
- removing the restriction of the one or more UE-based UIs in response to the detection; and
- stopping the forwarding of the one or more UE-based UIs in response to the detection.

13. A user equipment (UE) within a vehicle with an in-vehicle configuration that includes a driver operation zone, comprising:
- a memory; and
- a processor coupled with the memory and configured with processor-executable instructions to perform operations comprising:
  - determining that the UE is located within the driver operation zone of the vehicle based upon interaction between the UE and an in-vehicle location detection system;
  - restricting, in response to the driver operation zone determination, one or more UE-based user interfaces (UIs) provisioned on the UE for accessing one or more UE-based features;
  - forwarding, in response to the driver operation zone determination, the one or more UE-based UIs to a vehicle-based UI controller that is coupled to a vehicle-based UI of the vehicle that is accessible to an operator of the UE within the driver operation zone to permit access to the one or more UE-based features via the vehicle-based UI;
  - determining that the UE is located within a given zone of the vehicle based upon interaction between the UE and the in-vehicle location detection system;

receiving a request to stream media from the UE to at least one zone;
identifying at least one target media presentation device in the at least one zone;
associating the UE with the at least one target media presentation device in the at least one zone;
streaming the media from the UE to the at least one target media presentation device in the at least one zone for presentation thereon;
determining whether the given zone is an administrator operation zone or a guest operation zone;
permitting a first level of access to data and/or services via the UE if the given zone corresponds to the administrator operation zone, and permitting a second level of access to the data and/or services via the UE if the UE corresponds to the guest operation zone.

14. The user equipment of claim 13,
wherein the in-vehicle location detection system includes a plurality of Bluetooth transceivers deployed throughout the vehicle, and
wherein the determining that the UE is located within the driver operation zone determines that the UE is located within the driver operation zone of the vehicle based upon a Bluetooth Low Energy (BTLE) Received Signal Strength Indicator (RSSI) between the UE and at least one of the plurality of Bluetooth transceivers.

15. The user equipment of claim 13, wherein the determining that the UE is located within the driver operation zone includes:
partitioning an interior area of the vehicle into the driver operation zone and at least one non-driver operation zone,
determining a relative position of the UE within the interior area based upon the interaction between the UE and the in-vehicle location detection system, and
detecting that the determined relative position of the UE within the interior area is inside of the partitioned area corresponding to the driver operation zone.

16. The user equipment of claim 13,
wherein the forwarding forwards the one or more UE-based UIs to the vehicle-based UI controller while retaining control over the one or more UE-based features at the UE, or
wherein the forwarding forwards the one or more UE-based UIs to the vehicle-based UI controller while splitting control over the one or more UE-based features between the UE and the vehicle-based UI controller, or
wherein the forwarding forwards the one or more UE-based UIs to the vehicle-based UI controller by handing off control of the one or more UE-based features from the UE to the vehicle-based UI controller such that the UE is not responsible for processing of the one or more UE-based features after the handoff.

17. The user equipment of claim 13, the operations further comprising:
detecting that the UE has exited the driver operation zone of the vehicle and entered into a non-driver operation zone of the vehicle;
permitting the second level of access to the data and/or services via the UE in response to the detection.

18. A user equipment (UE) within a vehicle with an in-vehicle configuration that includes a driver operation zone, comprising:
a memory; and
a processor coupled with the memory and configured with processor-executable instructions to perform operations comprising:
determining that the UE is located within the driver operation zone of the vehicle based upon interaction between the UE and an in-vehicle location detection system;
restricting, in response to the driver operation zone determination, one or more UE-based user interfaces (UIs) provisioned on the UE for accessing one or more UE-based features;
forwarding, in response to the driver operation zone determination, the one or more UE-based UIs to a vehicle-based UI controller that is coupled to a vehicle-based UI of the vehicle that is accessible to an operator of the UE within the driver operation zone to permit access to the one or more UE-based features via the vehicle-based UI;
determining that the UE is located within a given zone of the vehicle based upon interaction between the UE and the in-vehicle location detection system;
receiving a request to stream media from the UE to at least one zone;
identifying at least one target media presentation device in the at least one zone;
associating the UE with the at least one target media presentation device in the at least one zone; and
streaming the media from the UE to the at least one target media presentation device in the at least one zone for presentation thereon,
wherein the at least one zone is a different zone than the given zone and the at least one target media presentation device includes a first set of media presentation devices configured to support media presentation within the different zone, or
wherein the at least one zone includes the given zone and at least one other zone and the at least one target media presentation device includes a second set of media presentation devices configured to support media presentation within both the given zone and the at least one other zone.

19. The user equipment of claim 18,
wherein the in-vehicle location detection system includes a plurality of Bluetooth transceivers deployed throughout the vehicle, and
wherein the determining that the UE is located within the given zone determines that the UE is located within the given zone of the vehicle based upon a Bluetooth Low Energy (BTLE) Received Signal Strength Indicator (RSSI) between the UE and at least one of the plurality of Bluetooth transceivers.

20. The user equipment of claim 18, wherein the determining that the UE is located within the given zone includes:
partitioning an interior area of the vehicle into a plurality of zones,
determining a relative position of the UE within the interior area based upon the interaction between the UE and the in-vehicle location detection system, and
detecting that the determined relative position of the UE within the interior area is inside of the partitioned area corresponding to the given zone.

* * * * *